(12) United States Patent
Kim et al.

(10) Patent No.: US 11,270,992 B2
(45) Date of Patent: Mar. 8, 2022

(54) SEMICONDUCTOR DEVICES

(71) Applicant: SAMSUNG ELECTRONICS CO., LTD., Suwon-si (KR)

(72) Inventors: Jaehoon Kim, Seoul (KR); Jun Seomun, Seoul (KR); Sua Lee, Suwon-si (KR); Hyungock Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/992,422

(22) Filed: Aug. 13, 2020

(65) Prior Publication Data

US 2021/0134784 A1 May 6, 2021

(30) Foreign Application Priority Data

Nov. 5, 2019 (KR) .................. 10-2019-0140136
Mar. 24, 2020 (KR) .................. 10-2020-0035680

(51) Int. Cl.
*H01L 27/02* (2006.01)
*H01L 23/528* (2006.01)
(Continued)

(52) U.S. Cl.
CPC ........ *H01L 27/0207* (2013.01); *G06F 30/392* (2020.01); *G06F 30/394* (2020.01);
(Continued)

(58) Field of Classification Search
CPC ............. H01L 27/0207; H01L 23/5283; H01L 23/5286; H01L 29/0673; H01L 29/42392;
H01L 29/7851; H01L 29/78696; G06F 2115/12; G06F 30/392; G06F 30/398; G06F 30/394
(Continued)

(56) References Cited

U.S. PATENT DOCUMENTS

| 8,347,239 B2 | 1/2013 | Miloslavsky et al. |
| 8,468,488 B1 | 6/2013 | Burstein |

(Continued)

FOREIGN PATENT DOCUMENTS

| TW | 201618232 A | 5/2016 |
| TW | 201809859 A | 3/2018 |

*Primary Examiner* — Tong-Ho Kim
(74) *Attorney, Agent, or Firm* — Sughrue Mion, PLLC

(57) ABSTRACT

A semiconductor device includes standard cells disposed in a first direction parallel to an upper surface of a substrate and a second direction intersecting the first direction, each standard cell including an active region, a gate structure disposed to intersect the active region, source/drain regions on the active region at both sides of the gate structure, and first interconnection lines electrically connected to the active region and the gate structures; filler cells disposed between at least portions of the standard cells, each filler cell including a filler active region and a filler gate structure disposed to intersect the filler active region; and a routing structure disposed on the standard cells and the filler cells and including second interconnection lines electrically connecting the first interconnection lines of different standard cells to each other, wherein the second interconnection lines includes a first line having a first width and a second line having a second width larger than the first width.

20 Claims, 19 Drawing Sheets

(51) Int. Cl.
  *H01L 29/78* (2006.01)
  *H01L 29/06* (2006.01)
  *H01L 29/423* (2006.01)
  *H01L 29/786* (2006.01)
  *G06F 30/392* (2020.01)
  *G06F 30/394* (2020.01)
  *G06F 30/398* (2020.01)
  *G06F 115/12* (2020.01)

(52) U.S. Cl.
  CPC ........ *G06F 30/398* (2020.01); *H01L 23/5283* (2013.01); *H01L 23/5286* (2013.01); *H01L 29/0673* (2013.01); *H01L 29/42392* (2013.01); *H01L 29/7851* (2013.01); *H01L 29/78696* (2013.01); *G06F 2115/12* (2020.01)

(58) Field of Classification Search
  USPC ........................................................ 257/347
  See application file for complete search history.

(56) References Cited

U.S. PATENT DOCUMENTS

| | | | |
|---|---|---|---|
| 8,612,899 | B2 | 12/2013 | Miloslavsky et al. |
| 8,875,081 | B2 | 10/2014 | Chang et al. |
| 9,792,396 | B2 | 10/2017 | Arunachalam |
| 9,990,461 | B1 | 6/2018 | Colwell et al. |
| 2010/0187573 | A1* | 7/2010 | Iwata .................. H01L 27/0207 |
| | | | 257/204 |
| 2016/0085899 | A1 | 3/2016 | Qian et al. |
| 2017/0300608 | A1 | 10/2017 | Narisetty et al. |
| 2018/0004883 | A1 | 1/2018 | Yuan et al. |
| 2018/0150592 | A1 | 5/2018 | Chang et al. |
| 2019/0211475 | A1 | 7/2019 | Ito et al. |
| 2019/0332738 | A1 | 10/2019 | Shao et al. |
| 2020/0365589 | A1* | 11/2020 | Liaw ............... H01L 21/823821 |

\* cited by examiner

SEMICONDUCTOR DEVICES

CROSS-REFERENCE TO RELATED APPLICATIONS

This application is based on and claims priority under 35 U.S.C. § 119 to Korean Patent Application No. 10-2019-0140136 filed on Nov. 5, 2019, and Korean Patent Application No. 10-2020-0035680 filed on Mar. 24, 2020 in the Korean Intellectual Property Office, the disclosures of which are incorporated by reference herein in their entirety.

BACKGROUND

The disclosure relates to semiconductor devices.

Due to an increase in demand for high-performance, high-speed semiconductor devices and/or multifunctional semiconductor devices, a degree of integration of semiconductor devices has increased. With higher integration of semiconductor devices, research has been actively conducted on designing of a layout, particularly, effective routing of interconnections for connecting semiconductor elements to each other.

SUMMARY

In accordance with an aspect of the disclosure, a semiconductor device may have improved reliability and integration.

In accordance with an aspect of the disclosure, a semiconductor device includes a plurality of standard cells disposed in a first direction parallel to an upper surface of a substrate and a second direction intersecting the first direction, each standard cell from among the plurality of standard cells including an active region, a gate structure disposed to intersect the active region, a source region and a drain region disposed on the active region at either side of the gate structure, and a plurality of first interconnection lines electrically connected to the active region and the gate structure; a plurality of filler cells disposed between portions of the plurality of standard cells, each filler cell from among the plurality of filler cells including a filler active region and a filler gate structure disposed to intersect the filler active region; and a routing structure disposed on the plurality of standard cells and the plurality of filler cells, the routing structure including a plurality of second interconnection lines electrically connecting the respective plurality of first interconnection lines of different standard cells from among the plurality of standard cells to each other, wherein the plurality of second interconnection lines includes a first line having a first width and a second line having a second width larger than the first width.

In accordance with an aspect of the disclosure, a semiconductor device includes a first standard cell and a second standard cell disposed on a substrate, each of the first standard cell and the second standard cell including a semiconductor element and a first interconnection line electrically connected to the semiconductor element; and a routing structure including a plurality of second interconnection lines extending in a direction across and on the first standard cell and the second standard cell, each second interconnection line from among the plurality of second interconnection lines electrically connecting the first interconnection line of the first standard cell to the first interconnection line of second standard cell, wherein the plurality of second interconnection lines includes a first line and a second line having different widths from each other, and wherein the first line and the second line include signal transmission lines transmitting a signal to the respective semiconductor elements of the first standard cell and the second standard cell.

In accordance with an aspect of the disclosure, a semiconductor device includes a plurality of standard cells disposed on a substrate, each standard cell from among the plurality of standard cells including an active region, a gate structure disposed to intersect the active region, a source region and a drain region on the active region at either side of the gate structure, and a plurality of first interconnection lines electrically connected to the active region and the gate structure; and a routing structure electrically connecting the plurality of standard cells to each other, wherein the routing structure includes a plurality of vias, each via from among the plurality of vias disposed on a respective first interconnection line from among the plurality of first interconnection lines; and a plurality of second interconnection lines disposed on the plurality of vias to have a constant distance between respective centers of the plurality of second interconnection lines, and wherein a first line from among the plurality of second interconnection lines has a width different from a width of a second line from among the plurality of second interconnection lines.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Hereinafter, preferred example embodiments of the disclosure will be described as follows with reference to the accompanying drawings.

Figure 1:
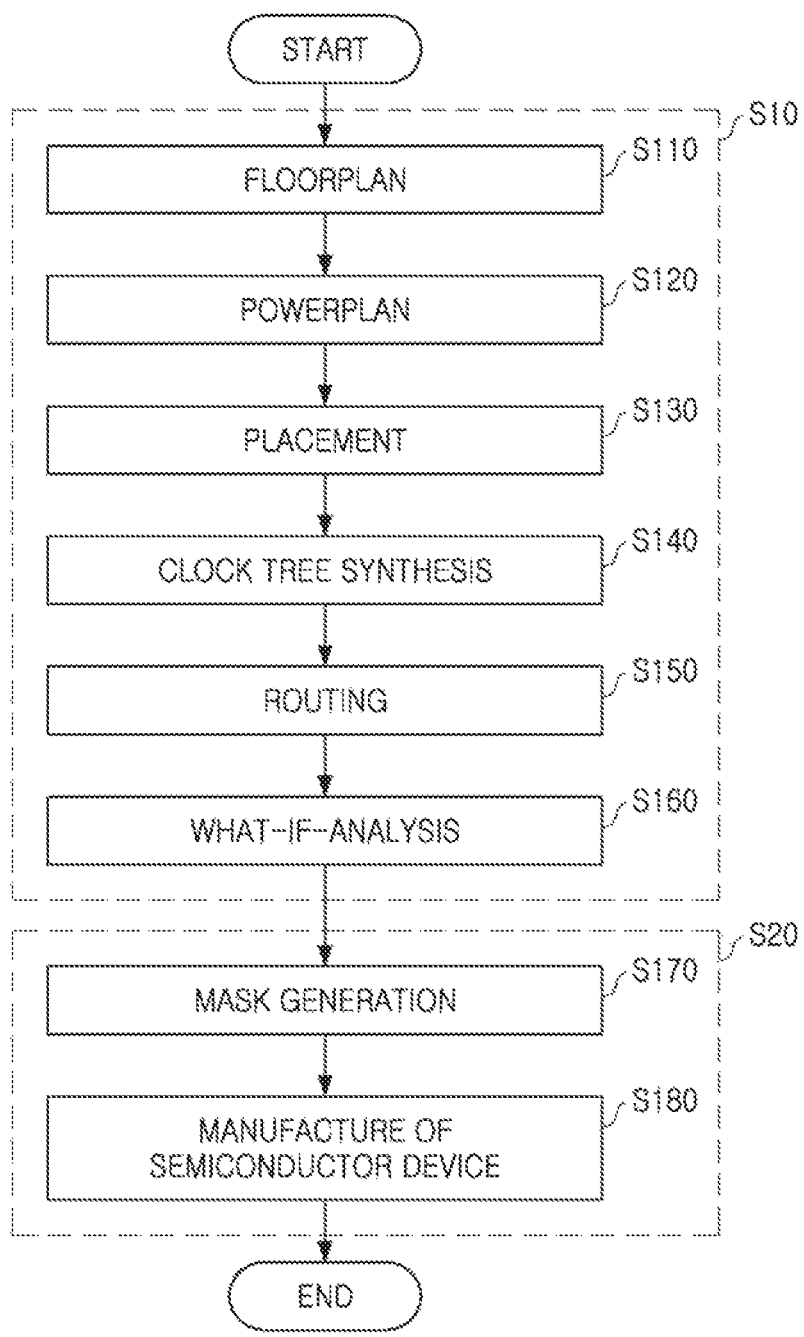
FIG. 1 is a flowchart illustrating a method for designing and manufacturing a semiconductor device according to an embodiment.

FIG. 1 is a flowchart illustrating a method for designing and manufacturing a semiconductor device according to example embodiments.

Referring to FIG. 1, a method of manufacturing a semiconductor device may include a semiconductor device-designing process (S10) and a semiconductor device-manufacturing process (S20). The semiconductor device-designing process (S10) is a process of designing a layout of a circuit and may be carried out using a tool for circuit designing. The tool may be a program including a plurality of commands executed by a processor. Accordingly, the semiconductor device-designing process (S10) may be a computer-implemented process for designing a circuit. The semiconductor device-manufacturing process (S20) is a process of manufacturing a semiconductor device based on the designed layout and may be carried out in a semiconductor process module.

The semiconductor device-designing process (S10) may include a floorplan process (5110) a powerplan process (S120), a placement process (S130), a clock tree synthesis (CTS) process (S140), a routing process (S150) and a what-if-analysis process (S160).

The floorplan process (S110) may be a physical designing process including cutting and shifting a logically designed schematic circuit. A memory or a functional block may be arranged in the floorplan process (S110). In this process, for example, functional blocks, which are supposed to be adjacently placed, can be identified, and spaces can be allocated for the functional blocks in consideration of available space, required performance, and the like. For example, the floorplan process (S110) may include a process of producing a site-row and a process of forming a metal routing track in the produced site-row. The site-row is a frame accommodating standard cells stored in a cell library according to a design rule. The metal routing track is a virtual line along which routings are to be formed later. In particular, in example embodiments, the metal routing track may include two or more non-uniform tracks having different default width values. In said tracks, interconnection lines having different widths may be arranged in the subsequent routing process (S150).

The powerplan process (S120) may be a process of disposing patterns of interconnection lines connecting local power, for example, a driving voltage or ground, to the functional blocks arranged in the floorplan process (S110). For example, layout patterns of interconnection lines connecting power or a ground may be generated in the form of a net such that power may be uniformly supplied to an entire chip. In this process, the patterns may be formed in the form of a net based on various rules.

The placement process (S130) is a process of arranging patterns of elements constituting the functional block, and may include a process of arranging standard cells. In particular, in example embodiments, each standard cell may include semiconductor elements and first interconnection lines connected thereto. The first interconnection lines may include a power transmission line connecting power or a ground and a signal transmission line transmitting a control signal, an input signal or an output signal. Empty regions may be generated between the standard cells arranged in this process, and may be filled by filler cells. In contrast to standard cells including an operable semiconductor element, a unit circuit such as an inverter circuit, a NAND circuit, a NOR circuit, and the like, implemented with the semiconductor elements, and the like, the filler cells may be a dummy region that does not include any operable semiconductor element. This process defines a shape or a size of a pattern for constituting a transistor and interconnection lines, which are to be actually formed on a silicon substrate. For example, in order to form an inverter circuit (which is an example of a unit circuit included in a standard cell) on the actual silicon substrate, layout patterns, such as PMOS, NMOS, N-WELL, a gate electrode, and interconnection lines to be disposed thereon, may be appropriately disposed.

The CTS process (S140) may be a process of generating patterns of signal lines of a central clock related to a response time for determining performance of the semiconductor device.

The routing process (S150) may be a process of producing an upper routing structure including second interconnection lines connecting the arranged standard cells. The second interconnection lines are electrically connected to the first interconnection lines in the standard cells and electrically connect the standard cell to other standard cells. The second interconnection lines may be configured to be physically formed on top of the first interconnection lines. In example embodiments, when the metal routing track is formed to include two or more non-uniform tracks having different width values in the floorplan process (S110), two second interconnection line having different widths may be placed in the tracks in this process.

The what-if-analysis process (S160) may be a virtual analysis process of verifying and modifying a produced layout generating through above processes S110 to S150. The verification items may include a design rule check (DRC) for verifying whether the layout meets a given design rule, an electrical rule check (ERC) for verifying whether there is an electrical disconnection in the layout, a layout vs. schematic (LVS) for verifying whether the layout is coincident with a gate-level netlist, and the like. In particular, in example embodiments, verification and modification may be performed in this process on an electric path according to the second interconnection lines produced by the routing process (S150). This will be described in more detail with reference to FIG. 2.

The semiconductor device-manufacturing process (S20) may include a mask-producing process (S170) and a semiconductor device-manufacturing process (S180).

The mask-producing process (S170) may include performing an optical proximity correction (OPC), or the like, on layout data produced during the semiconductor device-designing process (S10) to produce mask data for forming various patterns on a plurality of layers and to manufacture a mask using the mask data. The OPC may correct a distortion which may occur during a photolithography process. The mask may be manufactured by describing the layout patterns using a chromium layer deposited on a glass or quartz substrate.

Various exposure and etching processes may be repeatedly performed during the semiconductor device-manufacturing process (S180). Through such processes described above, the shapes of the patterns defined during the layout designing process may be sequentially formed on the silicon substrate. Specifically, a plurality of the masks are used to perform various semiconductor processes on a semiconductor substrate such as a wafer and the like, thereby forming a semiconductor device implemented with an integrated circuit. The semiconductor process may include a deposition process, an etching process, an ion implantation process, a cleaning process, and the like. Further, the semiconductor process may include a packaging process including mounting a semiconductor device on a printed circuit board (PCB) and encapsulating the same with an encapsulant, and the semiconductor process may include a test process for the semiconductor device or the package.

Figure 2:
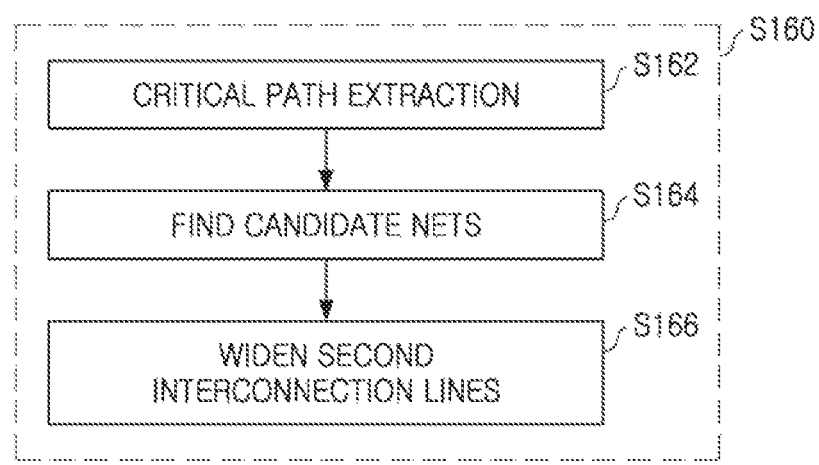
FIG. 2 is a flowchart partially illustrating a method for designing a semiconductor device according to an embodiment.

FIG. 2 is a flowchart partially illustrating a method for designing a semiconductor device according to example embodiments. FIG. 2 specifically illustrates the what-if-analysis process (S160) of FIG. 1.

Based on FIG. 2, the what-if-analysis process (S160) may include a critical path extraction process (S162), a process of finding candidate nets (S164), and a process of widening the second interconnection lines (S166).

The critical path extraction process (S162) may be a process of verifying timing criticality in the second interconnection lines under an operational condition of semiconductor elements according to the generated layout to find a critical path.

The process of finding candidate nets (S164) may be a process of finding a candidate net, among the extracted critical paths, to adjust widths of the second interconnection lines. In this process, a candidate net may be determined in consideration of DRC, or the like, in relation to other adjacent interconnection lines.

The process of widening the second interconnection lines (S166) may be a process of modifying the layout by expanding the widths of the second interconnection lines of the candidate net. In example embodiments, such modification of the second interconnection line widths may be carried out only in this process (S166) alone or together with the width modification by the previously described non-uniform metal routing tracks with reference to FIG. 1 (e.g., the routing process S150). Alternately, in example embodiments, the what-if-analysis process (S160) may be omitted, which is a case in which the width modification of the second interconnection lines may be carried out by the width modification by the previously described non-uniform metal routing tracks.

Figure 3A:
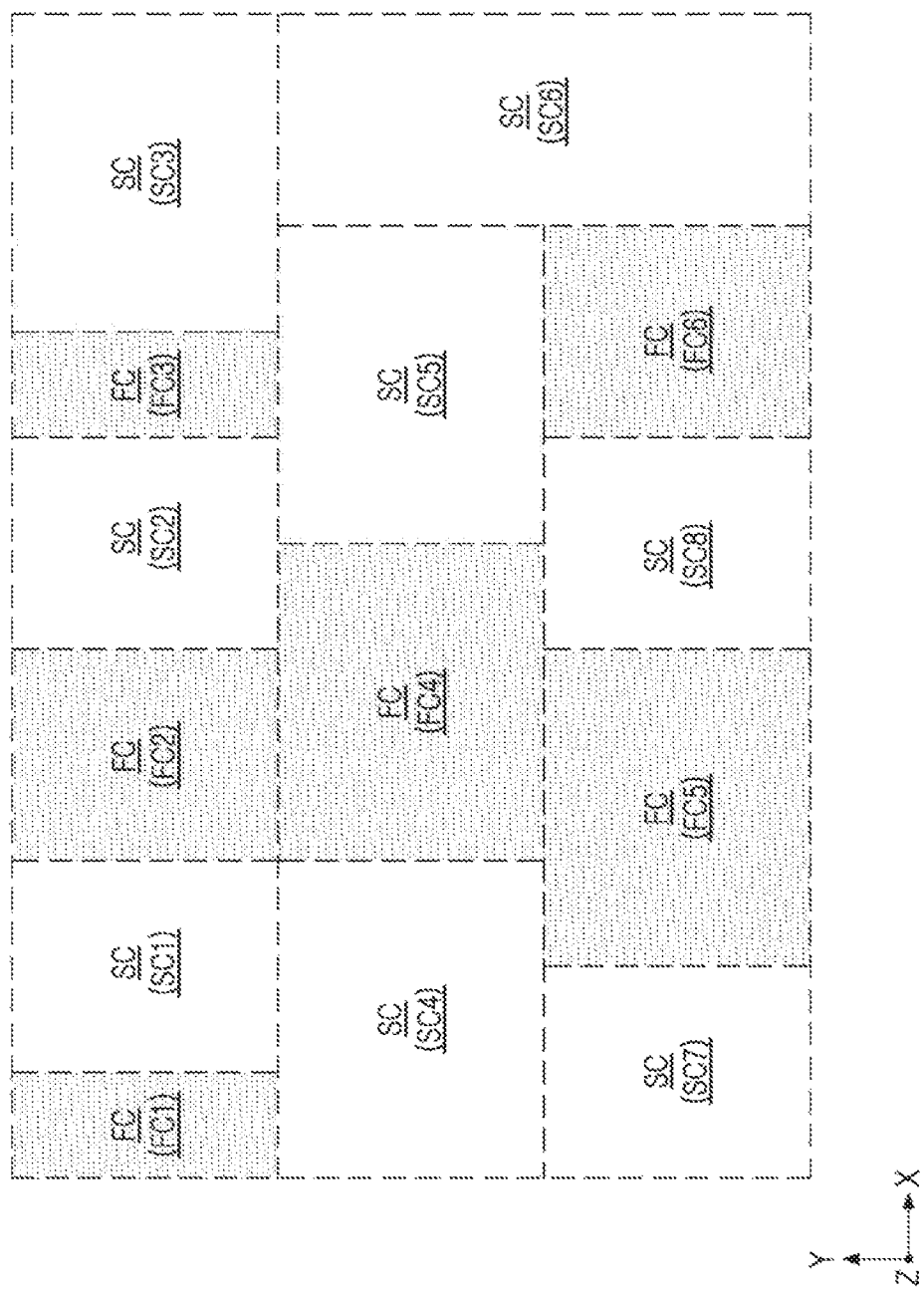
FIGS. 3A and 3B are schematic plan views illustrating a semiconductor device according to an embodiment.
Figure 3B:
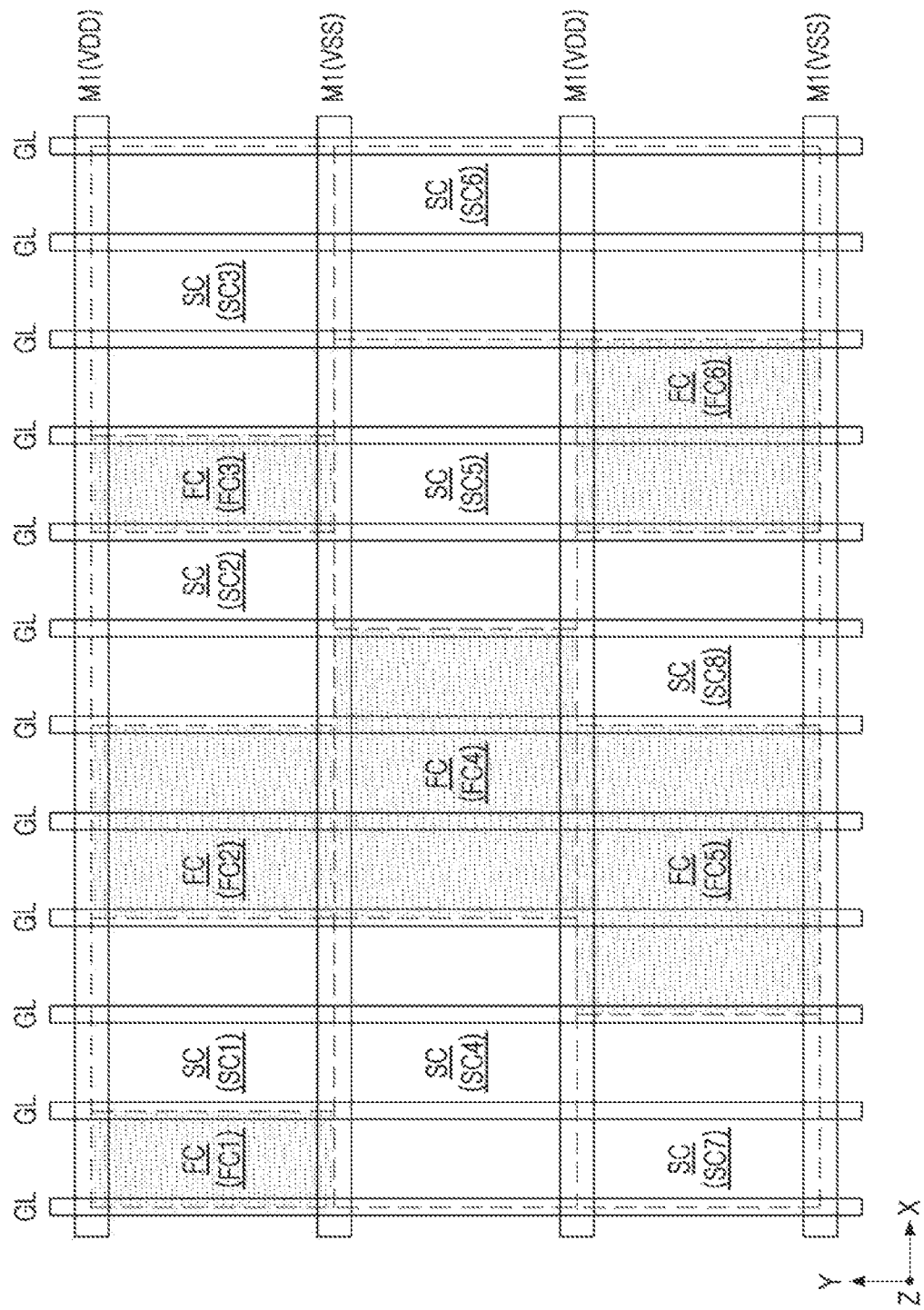

FIGS. 3A and 3B are schematic plan views illustrating a semiconductor device according to example embodiments. FIG. 3B is a plan view additionally illustrating power transmission lines M1(VDD) and M1(VSS) and gate lines GL in the plan view of FIG. 3A.

Referring to FIGS. 3A and 3B, a semiconductor device may include standard cell regions SC and filler cell regions FC. First to eighth standard cells SC1 to SC8 are disposed in the standard cell regions SC to implement circuits therein. First to sixth filler cells FC1 to FC6 are disposed in the filler cell regions FC to form a dummy region. Shapes and numbers of the first to eighth standard cells SC1 to SC8 and the first to sixth filler cells FC1 to FC6, illustrated in FIGS. 3A and 3B, are provided as an example and thus may be variously modified in example embodiments. The semiconductor device may include power transmission lines M1(VDD) and M1(VSS) and gate lines GL as shown in FIG. 3B.

The power transmission lines M1(VDD) and M1(VSS) may extend in a first direction, for example, the X direction in FIG. 3B. The power transmission lines M1(VDD) and M1(VSS) may be spaced apart from each other in a second direction, for example, the Y direction, intersecting the first direction. For example, the power transmission lines M1(VDD) and M1(VSS) may extend along a boundary between the standard cell regions SC and the filler cell regions FC. The power transmission lines M1(VDD) and M1(VSS) may include first power transmission lines M1(VDD) and second power transmission lines M1(VSS). According to example embodiments, at least one of the power transmission lines M1(VDD) and M1(VSS) may be disposed to cross at least one of the standard cell regions SC and the filler cell regions FC. In the example shown in FIG. 3B, one of the power transmission lines M1(VDD) crosses standard cell SC6.

The gate patterns GL may extend in the second direction and may be spaced apart from each other in the first direction. The gate patterns GL may include gate electrodes and dummy gate electrodes, which provide semiconductor elements. For example, the gate lines GL disposed on boundaries between the standard cell regions SC and the filler cell regions FC may be the dummy gate electrodes.

Figure 4A:
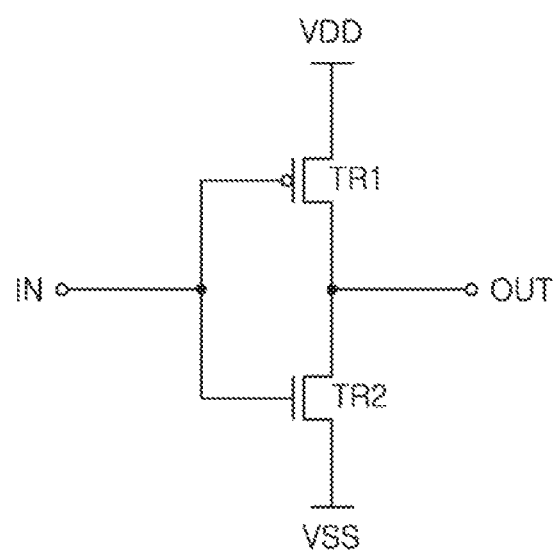
FIGS. 4A to 4C are a circuit diagram illustrating a unit circuit provided by a standard cell included in a semiconductor device according to an embodiment and layout diagrams illustrating a standard cell and a filler cell corresponding to the unit circuit.
Figure 4B:
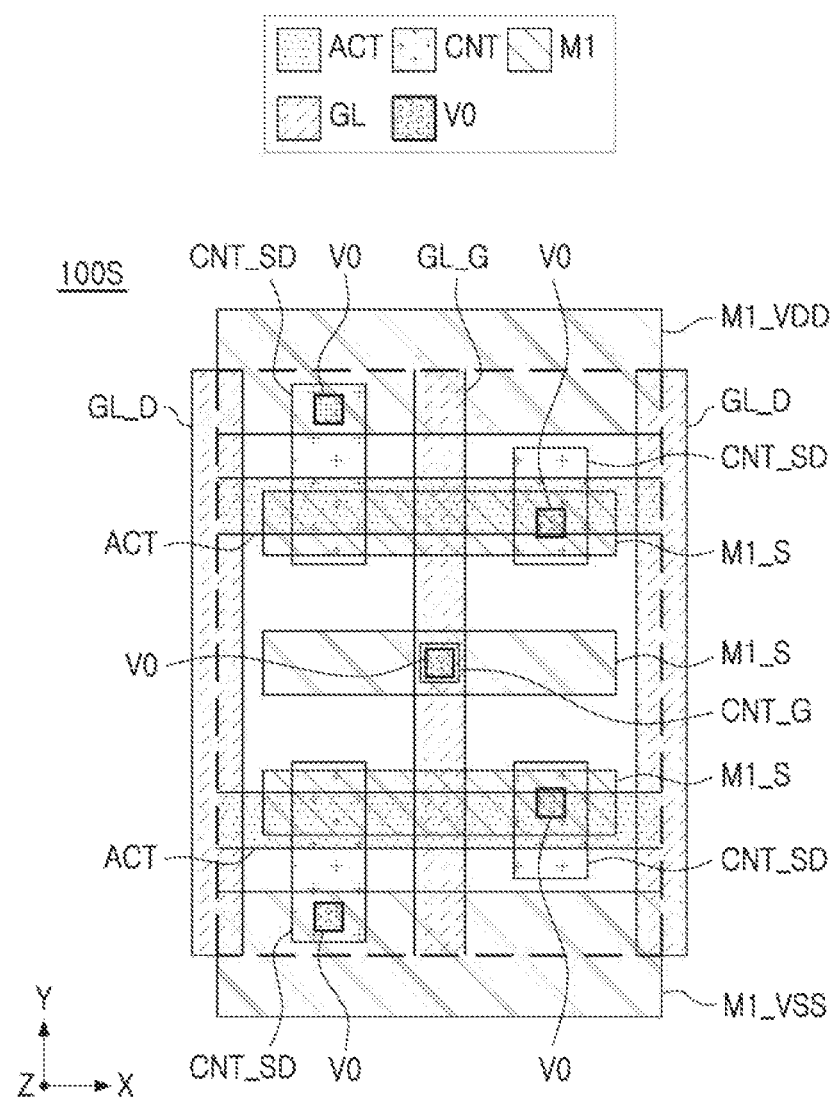
Figure 4C:
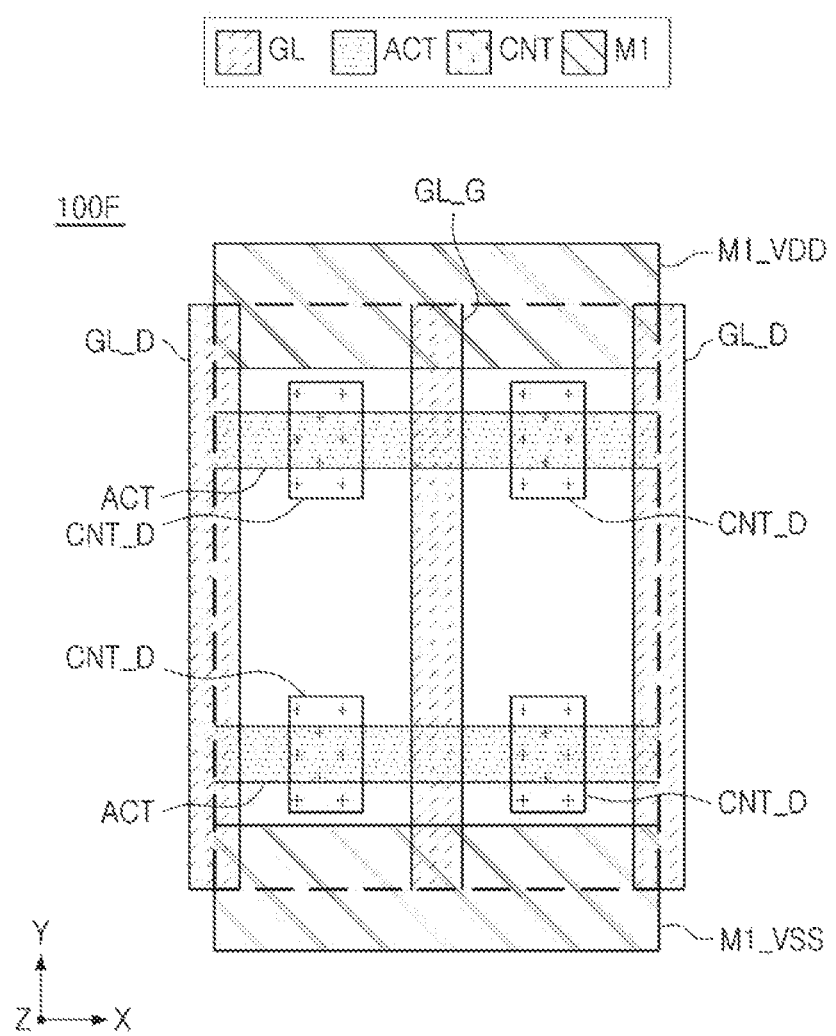

FIGS. 4A to 4C are a circuit diagram illustrating a unit circuit provided by a standard cell included in a semiconductor device according to example embodiments and layout diagrams illustrating a standard cell and a filler cell corresponding to the unit circuit.

Referring to FIG. 4A, the unit circuit may be, for example, an inverter circuit. The inverter circuit may include a pull-up element TR1 receiving first power VDD and a pull-down element TR2 receiving second power VSS. Gates of the pull-up element TR1 and the pull-down element TR2 may be connected to each other to provide an input terminal IN. Meanwhile, one of source/drain regions of the pull-up element TR1 and one of source/drain regions of the pull-down element TR2 may be connected to each other to provide an output terminal OUT. Such an inverter circuit, however, is merely an example of unit circuits provided by a standard cell. The standard cells may provide other various unit circuits, such as NAND standard cells and NOR standard cells, in addition to the inverter circuit.

Referring to FIG. 4B, a standard cell 100S may include a pair of active regions ACT extending in the X direction, gate lines GL extending in the Y direction, contacts CNT connected to the active regions ACT and the gate lines GL, lower vias V0 connected to the contacts CNT, and first interconnection lines M1 connected to the lower vias V0. According to example embodiments, the standard cell 100S may further include well regions. In FIG. 4B, a single standard cell 100S region is indicated by bold dashed lines, and some components arranged to cross a boundary of the standard cell 100S are illustrated as well for better understanding.

The active regions ACT may include, for example, one or more active fins extending in the X direction. The active regions ACT may be placed in different conductivity-type well regions and may be connected to upper source/drain contacts CNT_SD. In order to provide the inverter circuit of FIG. 4A, source/drain contacts CNT_SD connected to one of a pair of active regions ACT may be connected to a first power transmission line M1_VDD and signal transmission lines M1_S, among the first interconnection lines M1, via the lower vias V0, and source/drain contacts CNT_SD connected to the other one of the active regions ACT may be connected to a second power transmission line M1_VSS and the signal transmission lines M1_S, among the first interconnection lines M1, via the lower vias V0. In other words, one of the active regions ACT may be connected to both the first power transmission line M1_VDD and the signal transmission line M1_S, while the other one of the active regions ACT may be connected to both the second power transmission line M1_VSS and the signal transmission line M1_S.

The gate lines GL include a gate electrode GL_G and a dummy gate electrode GL_D. The gate electrode GL_G may intersect the active regions ACT. The gate electrode GL_G may provide the pull-up element TR1 and a pull-down element TR2 of the inverter circuit, together with the active region ACT. As the gates of the pull-up element TR1 and the pull-down element TR2 may be connected to each other in the inverter circuit of FIG. 4A, the gate electrode GL_G may be shared between a pair of active regions ACT. The gate electrode GL_G may be connected to the signal transmission line M1_S, among the first interconnection lines M1, through a gate contact CNT_G. The dummy gate electrode GL_D may be disposed at both ends in the X direction of a single standard cell 100S.

The first interconnection lines M1, as interconnections disposed on top of the gate lines GL and the active regions ACT, may extend in the X direction. The first interconnection lines M1 may include a first power transmission line M1_VDD, a second power transmission line M1_VSS and a signal transmission line M1_S. The first and second power transmission lines M1_VDD and M1_VSS may be power transmission lines respectively supplying different power voltages VDD and VSS to a semiconductor device and may be electrically connected to the source/drain regions on the active regions ACT. The signal transmission line M1_S may be a signal transmission line providing a signal to the semiconductor device and may be electrically connected to the gate electrode GL_G and the source/drain regions on the active regions ACT.

The first power transmission line M1_VDD and the second power transmission line M1_VSS are positioned across a boundary of the standard cell 100S, and for example, only a half thereof may be disposed inside the standard cell 100S. Regions of all of the first interconnection lines M1 that are disposed inside a single standard cell 100S may each have the same width in the Y direction, but may have different widths as in an example embodiment of FIG. 6. In example embodiments, an overall width of each of the first and second transmission lines M1_VDD and M1_VSS without considering the boundary of the standard cell 100S may be the same as the width of the signal transmission lines M1_S.

Referring to FIG. 4C, a filler cell 100F may include a pair of the active regions ACT extending in the X direction, the gate lines GL extending in the Y direction, the contacts CNT connected to the active regions ACT and the gate lines GL, and the first interconnection lines M1. The filler cell 100F may be a region in which dummy components or a dummy semiconductor element is disposed. In FIG. 4C, a single filler cell 100F is indicated by bold dashed lines, and some components arranged to cross a boundary of the filler cell 100F are illustrated for better understanding.

The active regions ACT in the filler cell 100F may be formed in a continuously extending pattern from the active regions ACT of the standard cells 100S in the X direction. For example, the active regions ACT may be on an extension line of the active regions ACT of the standard cells 100S. In example embodiments of a semiconductor device, the active regions ACT of the filler cell 100F may be spaced apart from the active regions ACT of the standard cells 100S by an active isolation layer 135 (see FIG. 8C) and implemented as the form of a dummy active region, but is not limited thereto. The active regions ACT may be connected to the contacts CNT_D.

The gate lines GL in the filler cell 100F include a gate electrode GL_G and a dummy gate electrode GL_D, and the gate electrode GL_G may be formed in a continuously extending pattern from the gate electrode GL_G of the standard cells 100S in the Y direction. For example, the gate lines GL_G may be disposed on an extension line of the gate electrode GL_G of the standard cells 100S. In example embodiments, the gate lines GL in the filler cell 100F may include a dummy gate electrode GL_D only, substantially separated from the gate electrode GL_G of the standard cells 100S.

The contacts CNT include dummy contacts CNT_D, and the dummy contacts CNT_D may not be connected to an upper interconnection line such as the first interconnection line M1. The first interconnection lines M1 may include first and second power transmission lines M1_VDD and M1_VSS. The first and second power transmission lines M1_VDD and M1_VSS may be formed in a continuously extending pattern respectively from the first and second power transmission lines M1_VDD and M1_VSS of the standard cells 100S in the X direction. According to example embodiments, however, a filler cell 100F may further include signal transmission lines M1_S. In this case, the contacts CNT may also be connected to the signal transmission lines M1_S. In this case, the signal transmission lines M1_S may be dummy interconnection lines to which an electric signal is not applied. Alternately, in example embodiments, the filler cell 100F may include, rather than a dummy interconnection line, signal transmission lines M1_S connected to the standard cell 100S. In this case, contacts CNT may be omitted in the filler cell 100F.

Figure 5A:
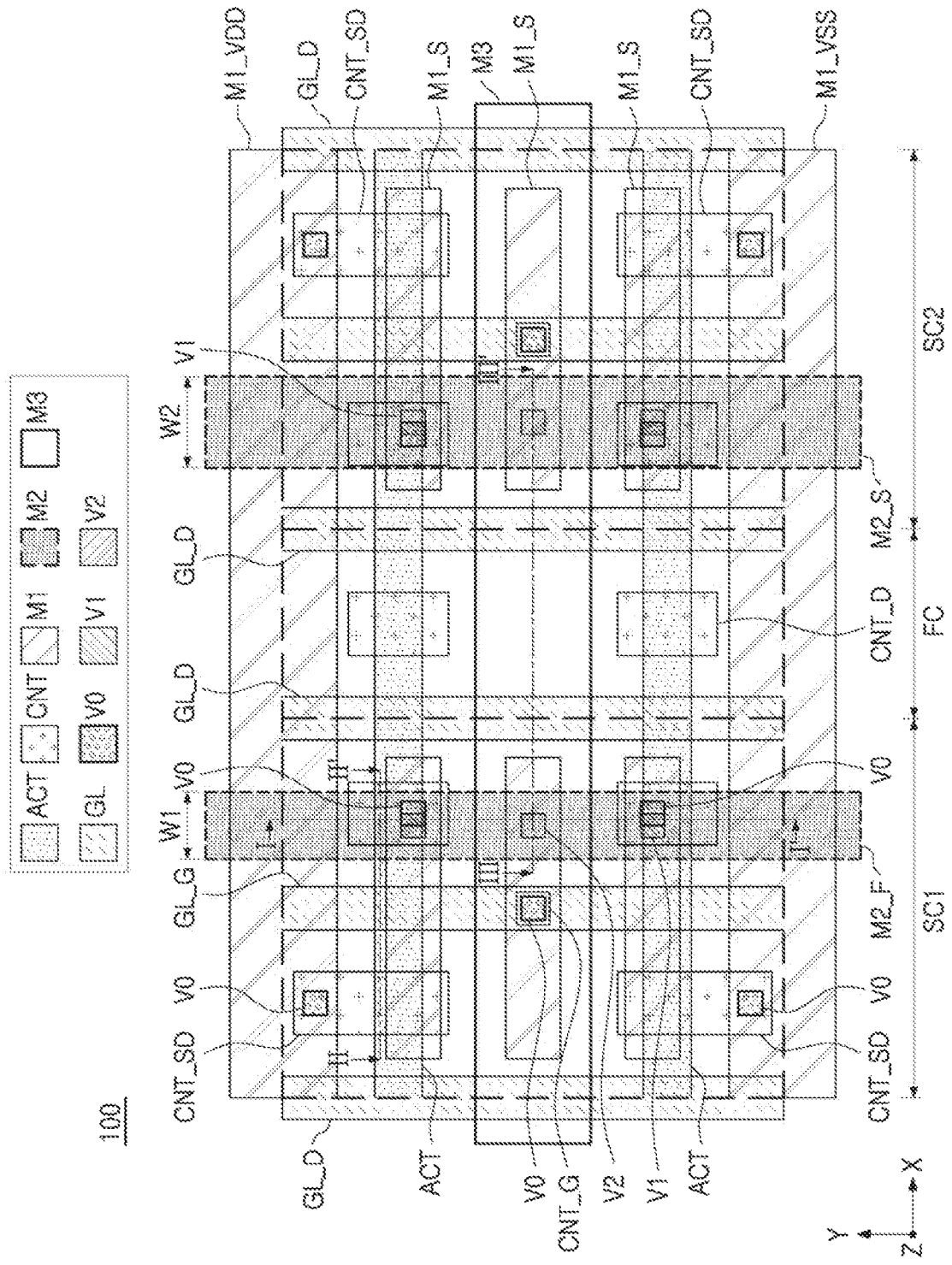
FIGS. 5A to 5D are layout diagrams illustrating a semiconductor device according to embodiments.
Figure 5B:
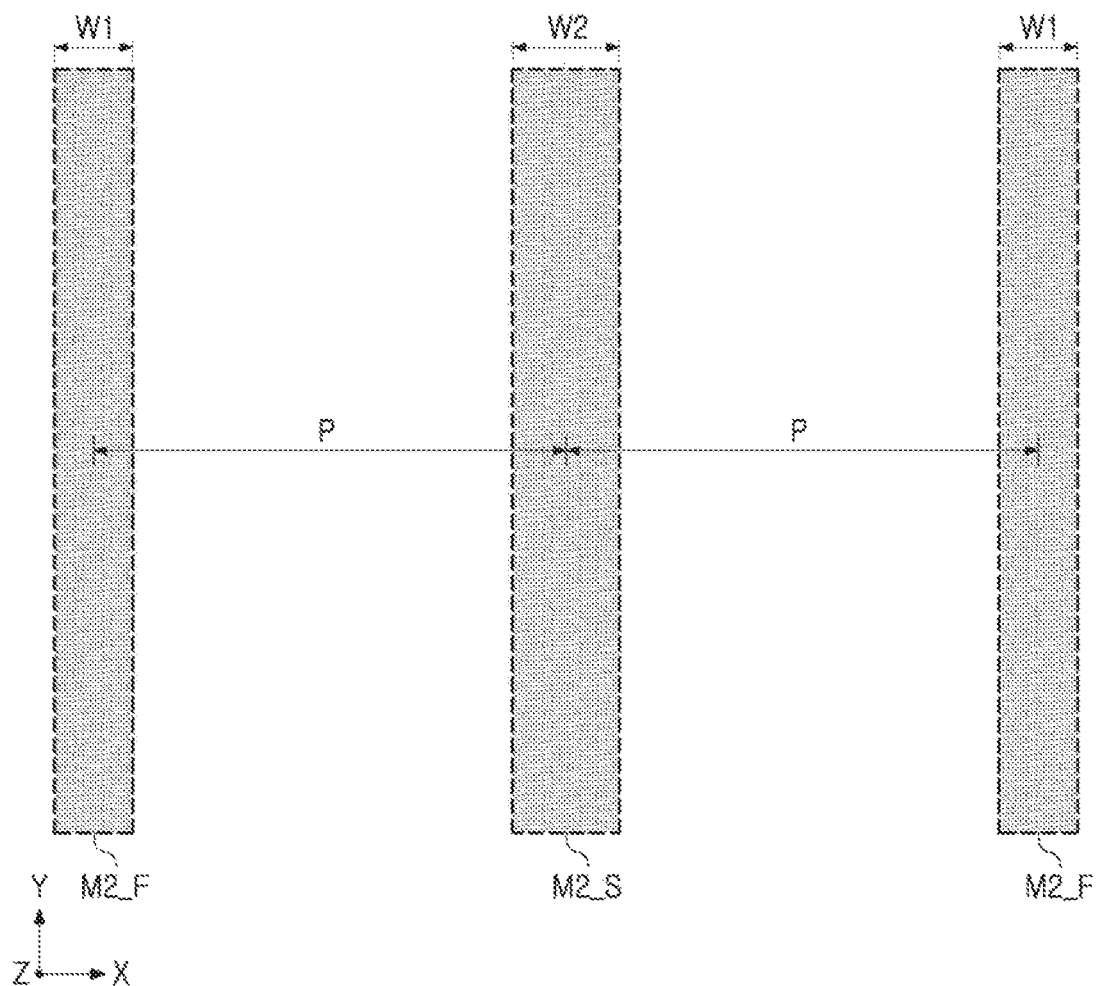
Figure 5C:
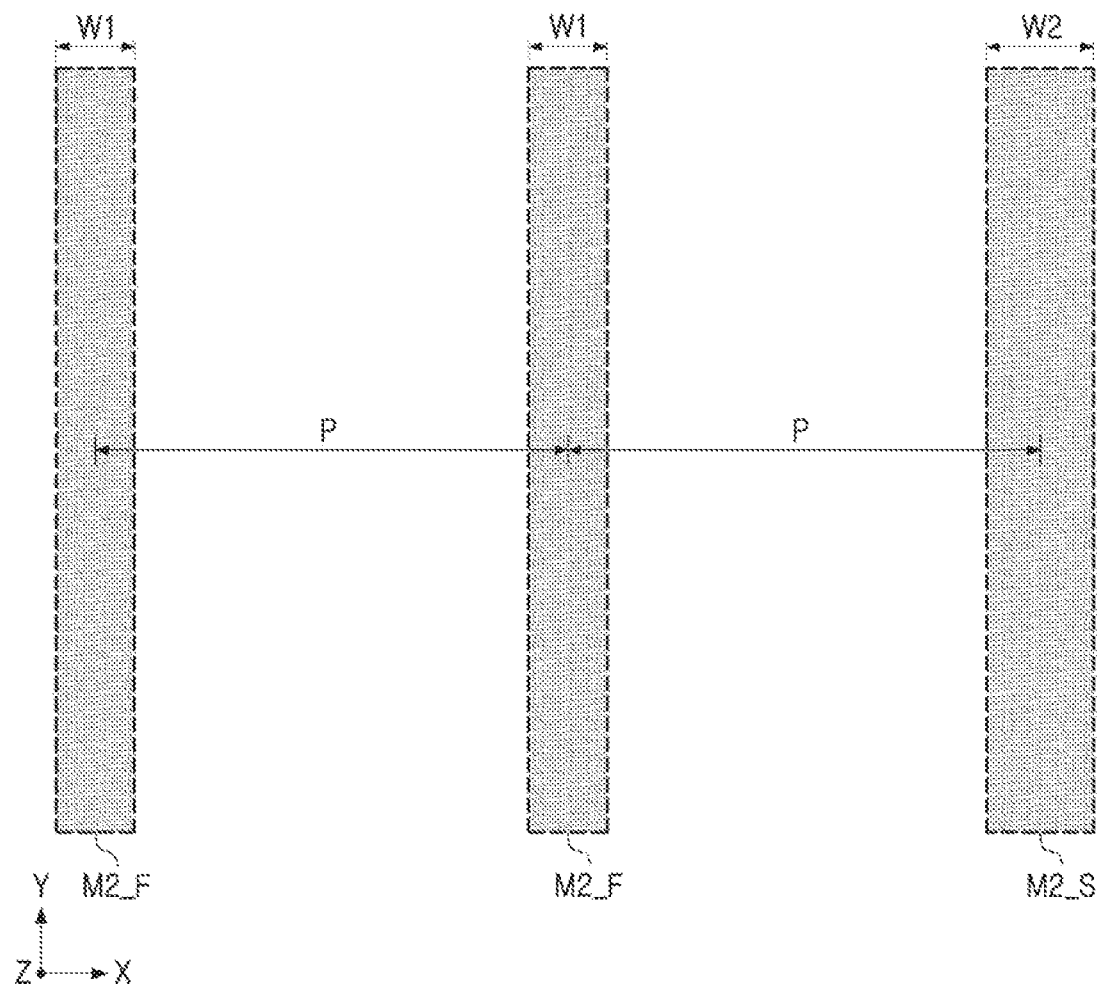
Figure 5D:
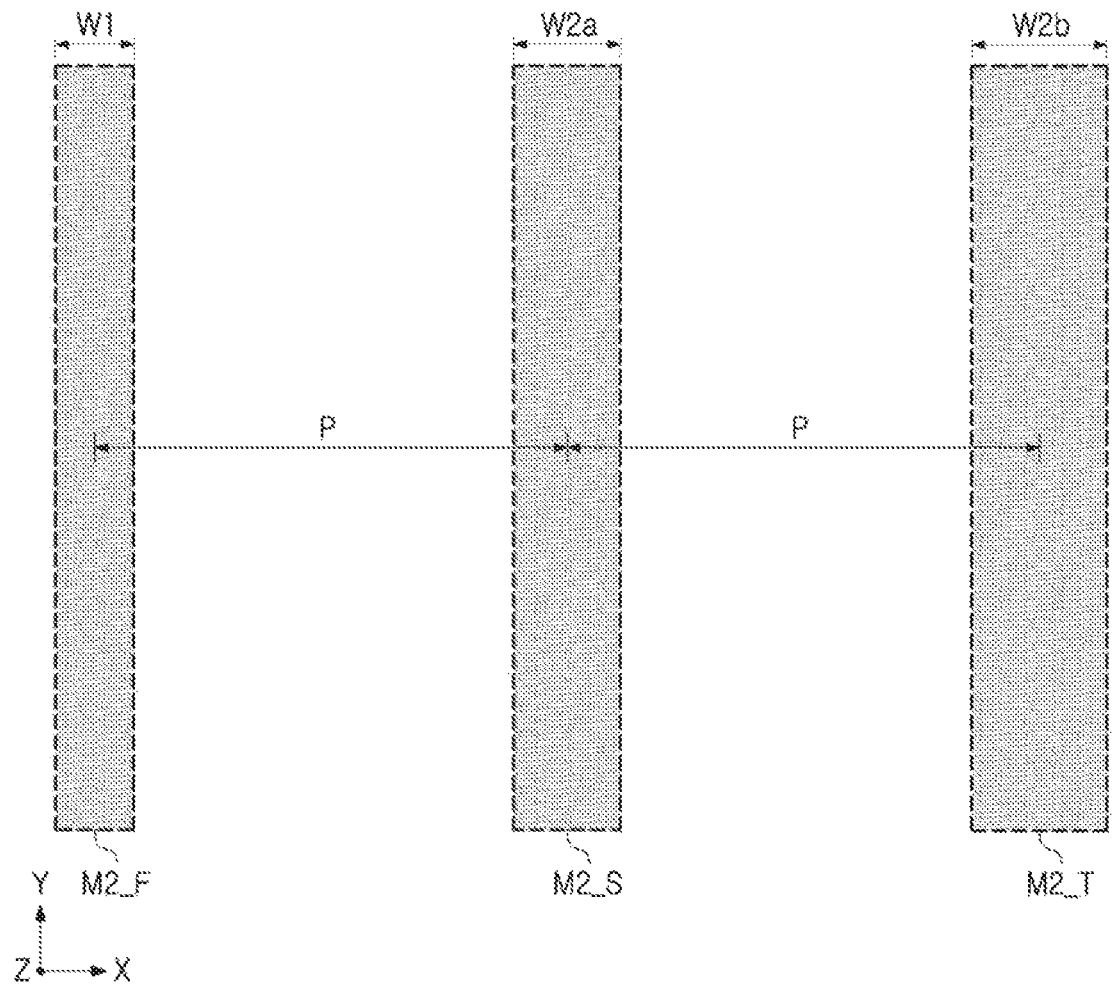

FIGS. 5A to 5D are layout diagrams illustrating a semiconductor device according to example embodiments. FIG. 5A illustrates a layout of one region including standard cells SC1 and SC2 identical or similar to the standard cell 100S of FIG. 4B and a filler cell FC similar to the filler cell 100F of FIG. 4C. FIGS. 5B to 5D illustrate layouts of the second interconnection lines M2 with respect to an area larger than that of FIG. 5A.

Referring to FIG. 5A, a semiconductor device 100 may include first and second standard cells SC1 and SC2 disposed in the X direction and a filler cell FC disposed therebetween. The first standard cell SC1 is identical to the standard cell 100S of FIG. 4B, and the second standard cell SC2 is in the form in which the left and the right of the standard cell 100S of FIG. 4B are reversed. The filler cell FC has a form corresponding to a half region in the X direction of the filler cell 100F of FIG. 4C (i.e., a left half or a right half of the filler cell 100F of FIG. 4C). Such arrangements of the first and second standard cells SC1 and SC2 and the filler cell FC are merely examples and may be variously modified in example embodiments.

The semiconductor device 100 may further include a routing structure disposed on the first and second standard cells SC1 and SC2 and the filler cell FC. The routing structure may include patterns produced in the routing process S150 previously described with reference to FIG. 1. Specifically, the routing structure may include first vias V1 connected to the first interconnection lines M1 inside the first and second standard cells SC1 and SC2 and the filler cell FC, second interconnection lines M2 connected to the first vias V1, second vias V2 connected to the second interconnection lines M2, and a third interconnection line M3 connected to the second vias V2. In the drawings, however, some of the above components of the routing structure are illustrated for better understanding.

The first vias V1 may be connected to at least a portion of the signal transmission lines M1_S, among the first interconnection lines M1. However, the first vias V1 may be disposed in all first interconnection lines M1 including the first and second power transmission lines M1_VDD and M1_VSS.

The second interconnection lines M2 may include a region extending in the Y direction perpendicular to the direction of extension of the first interconnection lines M1. According to example embodiments, the second interconnection lines M2 may include a region extending in the X direction in an unillustrated region of the semiconductor device 100. The second interconnection lines M2 may extend across the respective first and second standard cells SC1 and SC2 to be longer than the first and second standard cells SC1 and SC2. The second interconnection lines M2 may include first and second lines M2_F and M2_S having a first width W1 and a second width W2 in the X direction, respectively, where the first and second widths are different from each other as shown in FIGS. 5A-5D. The second width W2 may be larger than the first width W1. For example, the second width W2 may be in the range of about 101% to about 125% of the first width W1. A difference between the first and second widths falls within the range of about 5 nm to about 6 nm. For example, the first width W1 may be in the range of about 15 nm to about 40 nm.

The first and second lines M2_F and M2_S may be formed to have different widths in consideration of a circuit function of the semiconductor device 100. As previously described with reference to FIG. 1, the first and second lines M2_F and M2_S may be formed such that the metal routing track in the floorplan process (S110) includes non-uniform tracks having different default width values followed by producing the first and second lines M2_F and M2_S on the non-uniform tracks in the routing process (S150). Alternately, as previously described with reference to FIG. 2, the first and second lines M2_F and M2_S may be formed having the same width and then selectively expanding the width of the second interconnection line M2_S by the critical path extraction during the what-if-analysis process (S160). The position and the shape of the first and second lines M2_F and M2_S of FIG. 5A are merely examples and may be variously modified in example embodiments. Alternately, as in the example embodiment of FIG. 5D below, the second interconnection lines M2 may include three or more lines having different widths.

As previously described, the semiconductor device 100 includes the different first and second lines M2_F and M2_S so that timing criticality can be considered while controlling parasitic capacitance of the routing net, thereby improving timing quality of result (QoR) and turn around time (TAT).

The second vias V2 may be disposed on the second interconnection lines M2 to overlap therewith.

The third interconnection line M3 may be disposed on the second vias V2 to be connected thereto. The third interconnection line M3 may include a region extending in the X direction perpendicular to the direction of extension of the second interconnection lines M2. The third interconnection line M3 may extend across both of the first and second standard cells SC1 and SC2 and the filler cell FC to be longer than the first and second standard cells SC1 and SC2. The third interconnection line M3 may be disposed to electrically connect the first and second lines M2_F and M2_S having different widths to each other. The first and second lines M2_F and M2_S may be electrically connected to each other by the third interconnection line M3. In example embodiments, however, the first and second lines M2_F and M2_S may each be connected to different third interconnection lines M3.

Referring to FIG. 5B, the second interconnection lines M2 may include a first line M2_F, a second line M2_S and a first line M2_F (i.e., another first line M2_F), which are sequentially arranged in one direction, for example, the X direction. The first and second lines M2_F and M2_S may have a first width W1 and a second width W2, respectively, as previously described with reference to FIG. 5A. The first and second lines M2_F and M2_S may have a constant pitch P, a distance between centers thereof. This is, for example, a structure formed by producing the fixed non-uniform tracks having different default width values in the floorplan process (S110) followed by producing first and second lines M2_F and M2_S having different widths on the non-uniform tracks in the routing process (S150). In example embodiments, a distance between the adjacent first and second lines M2_F and M2_S may also be constant.

Referring to FIG. 5C, the second interconnection lines M2 may include a first line M2_F, another first line M2_F and a second line M2_S sequentially arranged in the X direction. The first and second lines M2_F and M2_S may have a first width W1 and a second width W2, respectively, as previously described with reference to FIG. 5A. The first and second lines M2_F and M2_S may have a constant pitch P, a distance between centers thereof. Accordingly, a first separation distance between the first line M2_F and the another first line M2_F, adjacent each other, may be larger than a second separation distance between the first line M2_F and the second line M2_S, adjacent each other.

Referring to FIG. 5D, the second interconnection lines M2 may include a first line M2_F, a second line M2_F and a third line M2_T sequentially arranged in the X direction. The first to third lines M2_F, M2_S and M2_T may have a first width W1, a second width W2a and a third width W2b, respectively. The second width W2a may be larger than the first width W1, and the third width W2b may be larger than the second width W2a. Also in this case, the first to third lines M2_F, M2_S and M2 T may have a constant pitch P, a distance between centers of the first to third lines M2_F, M2_S and M2 T. Accordingly, a third separation distance between the first and second lines M2_F and M2_S may be larger than a fourth separation distance between the second and third lines M2_S and M2_T.

Figure 6:
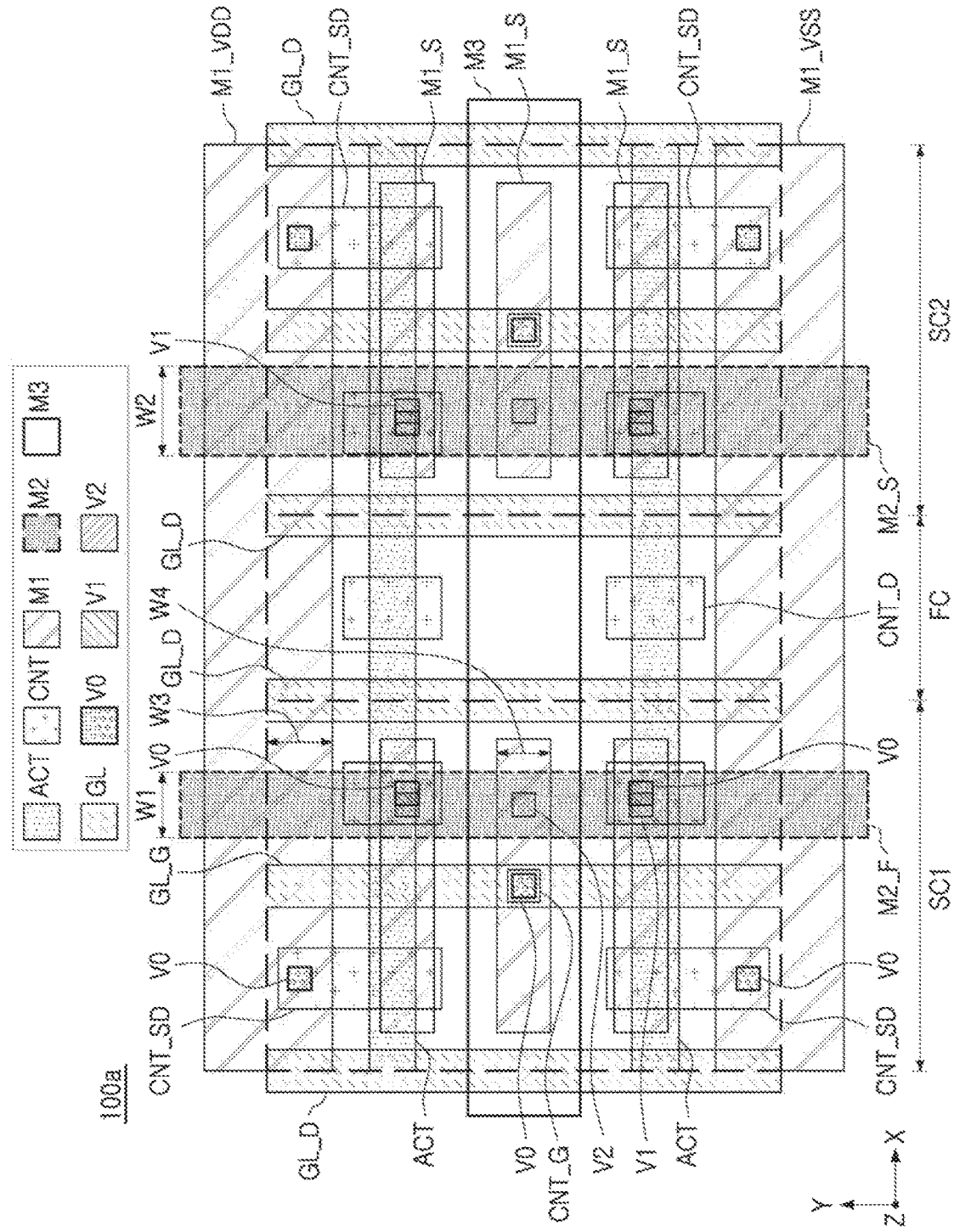
FIGS. 6 and 7 are layout diagrams illustrating a semiconductor device according to embodiments.
Figure 7:
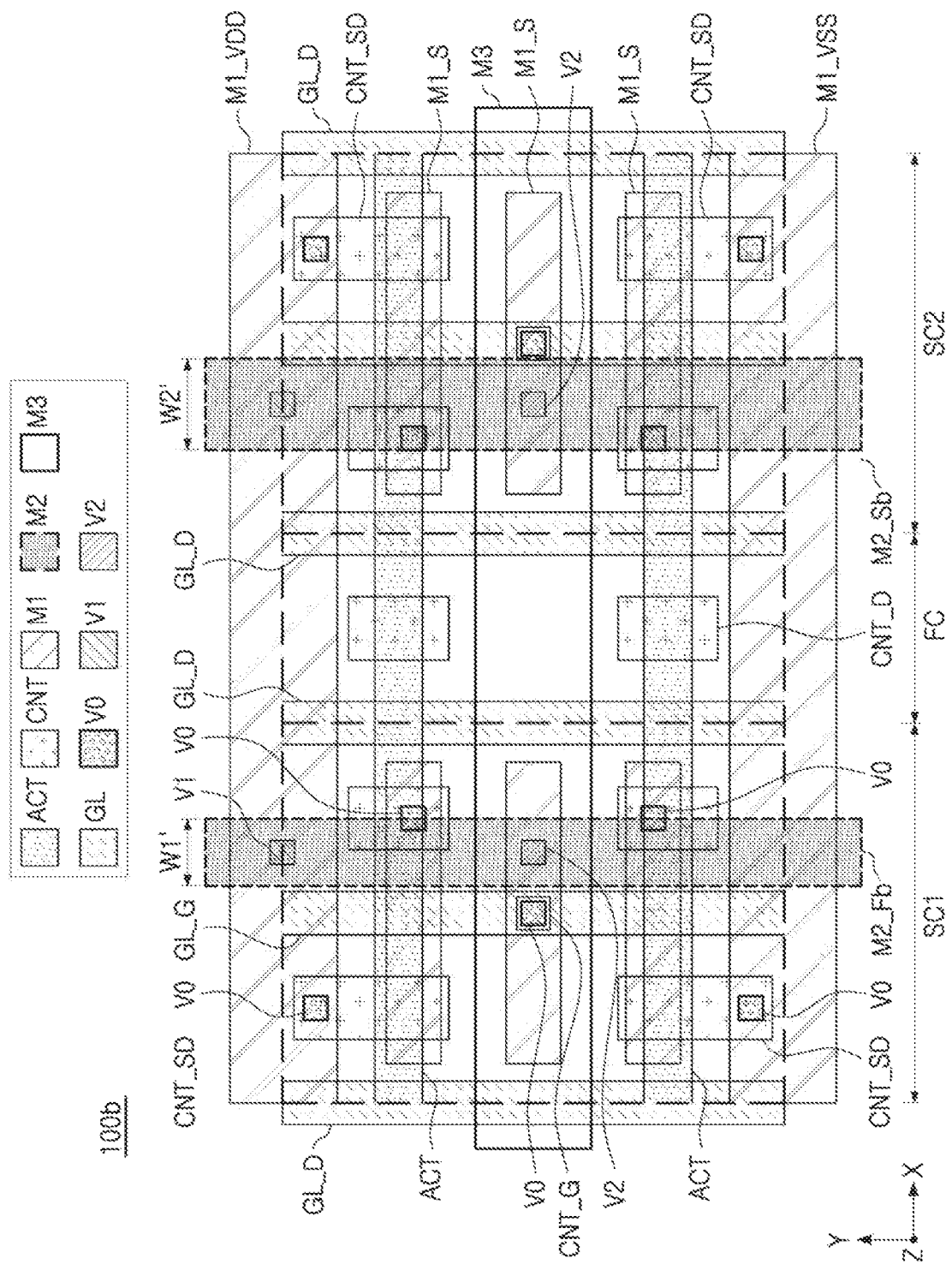

FIGS. 6 and 7 are layout diagrams illustrating a semiconductor device according to example embodiments.

Referring to FIG. 6, contrary to the example embodiment of FIG. 5A, a semiconductor device 100a may have regions of the first interconnection lines M1 positioned in the first and second standard cells SC1 and SC2, having different widths. Specifically, portions of a first power transmission line M1_VDD and a second power transmission line M1_VSS that lie within the first and second standard cells SC1 and SC2 may have a third width W3 in the Y direction perpendicular to the extension direction, while signal transmission lines M1_S may have a fourth width W4, smaller than the third width W3, in the Y direction. As previously described, the regions of the first interconnection lines M1 in the first and second standard cells SC1 and SC2 may have the same width as in the example embodiments of FIGS. 4B and 5A or different widths as in the present example embodiment. The first and second lines M2_F and M2 S of the second interconnection lines M2, however, may be disposed to have different widths in the upper routing structure, regardless of the shape of the first interconnection lines M1 in the first and second standard cells SC1 and SC2.

Referring to FIG. 7, a semiconductor device 100b may include first vias V1 and second interconnection lines M2 arranged differently from those in FIG. 5A. Specifically, the first vias V1 may be connected to the first power transmission line M1_VDD, among the first interconnection lines M1. However, the first vias V1 may be disposed in all first interconnection lines M1 including the second power transmission line M1_VSS and the signal transmission lines M1_S.

The second interconnection lines M2 may be connected to the first vias V1 to be electrically connected to the first power transmission line M1_VDD. The second interconnection lines M2 may include first and second lines M2_Fb and M2_Sb having a first width W1' and a second width W2', respectively, that are different from each other, in the X direction. As for the first and second widths W1' and W2', the relation of the first and second widths W1 and W2 described with respect to FIG. 5A may be identically applied. As such, in example embodiments, the first and second lines M2_Fb and M2_Sb, among the second interconnection lines M2, having different widths, may be lines electrically connected to at least one of the first power transmission line M1_VDD, the second power transmission line M1_VSS, and the signal transmission line M1_S.

The example embodiments of FIGS. 5A, 6 and 7 may be combined with each other. For example, the lines electrically connected to the first power transmission line M1_VDD and the signal transmission line M1_S, among the second interconnection lines M2, may have different widths. Alternately, in each case, the first interconnection lines M1 in the first and second standard cells SC1 and SC2 may be disposed to have an identical width or different widths.

Figure 8A:
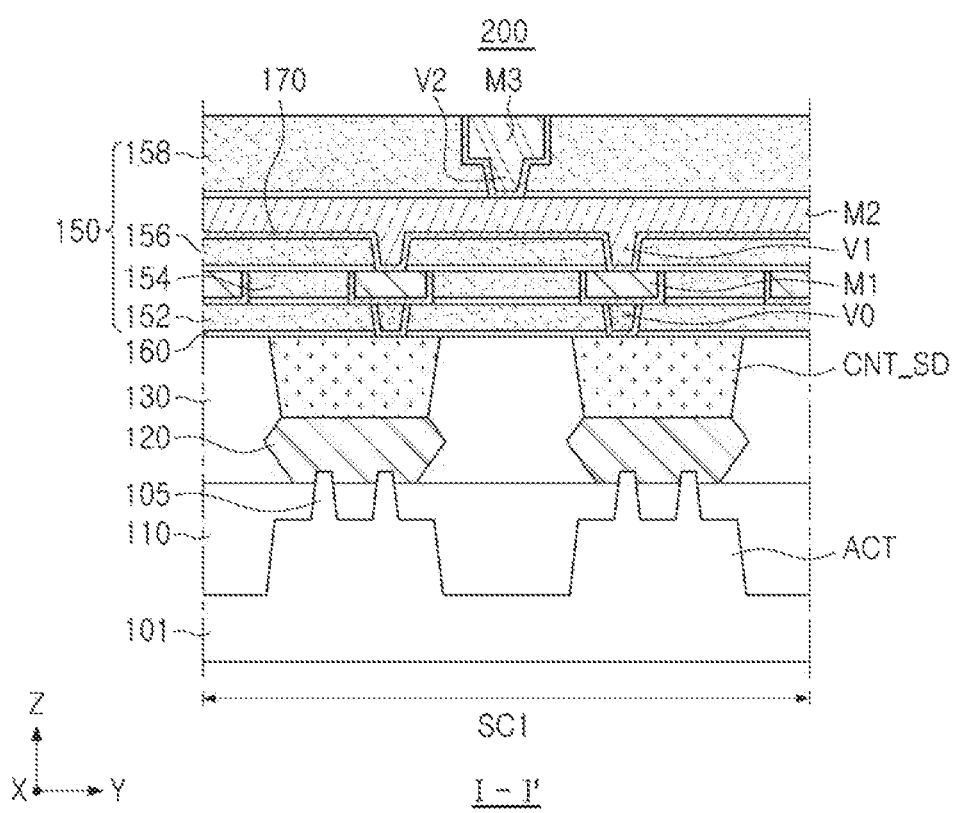
FIGS. 8A to 8C are cross-sectional views of a semiconductor device according to an embodiment.
Figure 8B:
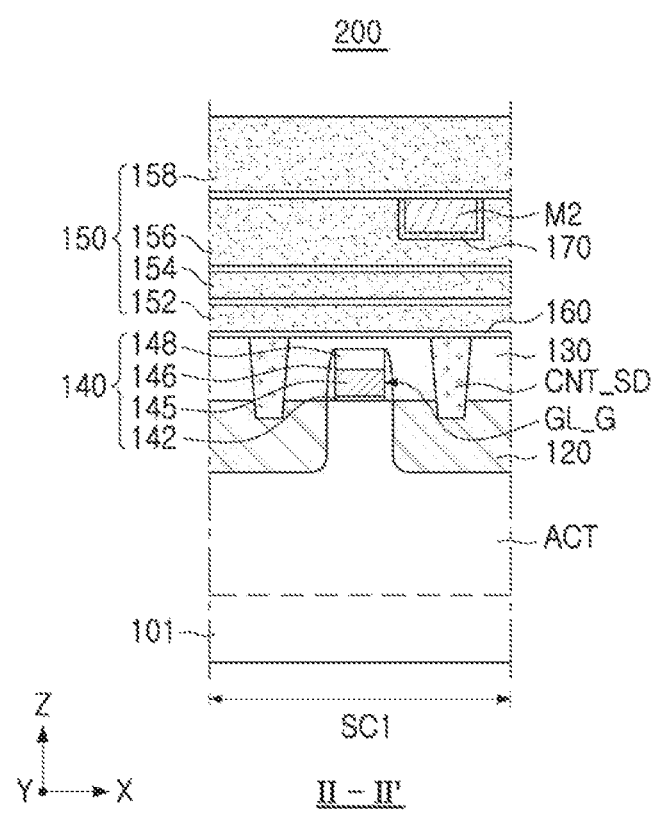
Figure 8C:
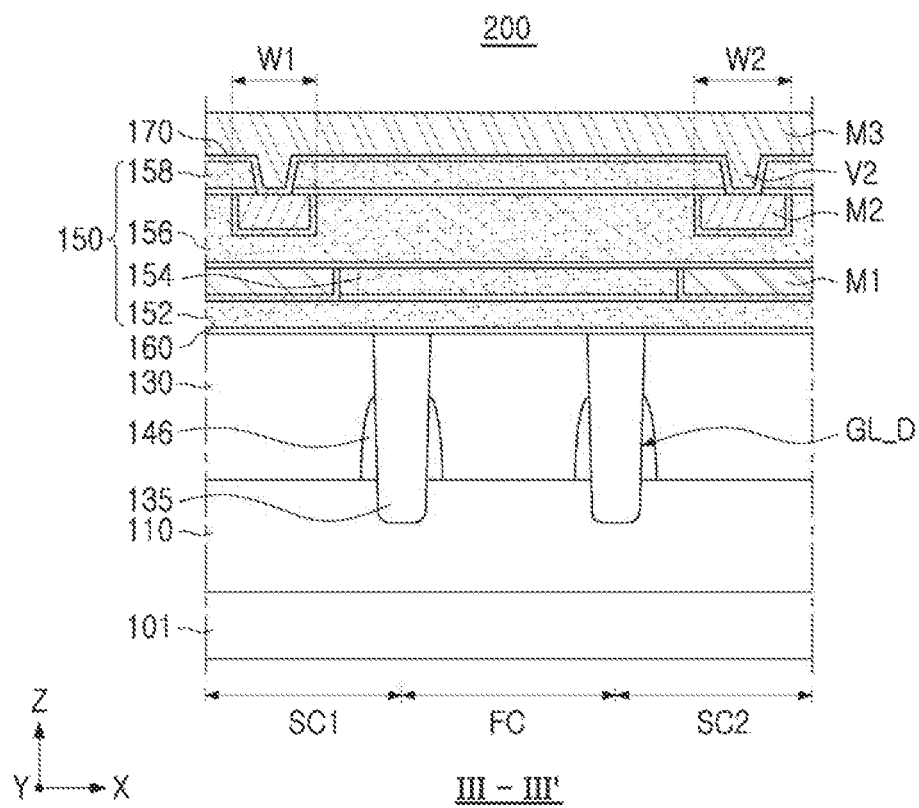

FIGS. 8A to 8C are cross-sectional views of a semiconductor device according to example embodiments. FIGS. 8A to 8C illustrate example cross-sections of the semiconductor device of FIG. 5A taken along lines I-I', II-II' and III-III'. For convenience of description, FIGS. 8A to 8C illustrate major components of the semiconductor device.

Referring to FIGS. 8A to 8C, a semiconductor device 200 may include a substrate 101, active regions ACT including active fins 105, an element isolation layer 110, source/drain regions 120, gate structures 140 including a gate electrode GL_G, a lower interlayer insulating layer 130, source/drain contacts CNT_SD, an upper interlayer insulating layer 150, a lower via V0, first interconnection lines M1 and a routing structure. The first interconnection lines M1 may be disposed in a first layer and the second interconnection lines M2 may be disposed in a second layer. The routing structure may include first vias V1 disposed on top of the first interconnection lines M1. The routing structure may further include second vias V2, and a third interconnection line M3. The semiconductor device 200 may further include active isolation layers 135 isolating the active regions ACT, etching-stop layers 160 disposed on a lower surface of the upper interlayer insulating layer 150, and barrier layers 170 disposed along lower surfaces of the interconnection lines M1 to M3 and the vias V0 to V2. The semiconductor device 200 may include a FinFET device, for example, a transistor in which the active regions ACT includes active fins 105 having a fin structure.

The substrate 101 may have an upper surface extending in the X and Y directions. The substrate 101 may include a IV-group semiconductor, a III-V group compound semiconductor or a II-VI group compound semiconductor. For example, the IV-group semiconductor may include silicon, germanium or silicon-germanium. The substrate 101 may be provided as a bulk wafer, an epitaxial layer, a silicon-on-insulator (SOI) layer, a semiconductor-on-insulator (SeOI) layer, or the like.

The element isolation layer 110 may define the active regions ACT. The element isolation layer 110 may be formed by, for example, a shallow trench isolation (STI) process. As illustrated in FIG. 8A, the element isolation layer 110 may include a region extending further downwardly into the substrate 101 between the adjacent active regions ACT, but is not limited thereto. According to example embodiments, the element isolation layer 110 may have a curved upper surface having an increasing level toward the active fins 105. The element isolation layer 110 may be formed of an insulating material, for example, an oxide, a nitride or combinations thereof.

The active regions ACT are defined by the element isolation layer 110 in the substrate 101 and may be disposed to extend in the first direction, for example, the X direction as shown in FIG. 8A. The active fins 105 may be disposed to protrude from the upper surface of the element isolation layer 110 by a predetermined height. The active fins 105 may be formed of a portion of the substrate 101 or may include an epitaxial layer grown from the substrate 101. The active fins 105 may be partially recessed on both sides of the gate structures 140, and source/drain regions 120 may be disposed on the recessed active fins 105. According to example embodiments, the active regions ACT may have doped regions including impurities. For example, the active fins may include impurities diffused from the source/drain regions 120 in a region in contact with the source/drain regions 120. In example embodiments, the active fins 105 may be omitted; in this case, the active regions ACT may have a structure including a planar upper surface.

The source/drain regions 120 may be disposed on the recessed region, in which the active fins 105 are recessed, on both sides of the gate structures 140 as shown in FIG. 8A. The source/drain regions 120 may be provided as a source region or a drain region of the transistors. An upper surface of the source/drain regions 120 may be placed at a level equal or similar to a lower surface of the gate structures 140 on a cross-section in the X direction as shown in FIG. 8B. However, relative heights of the source/drain regions 120 and the gate structures 140 may be variously modified according to example embodiments.

As illustrated in FIG. 8A, the source/drain regions 120 may be connected to each other in the Y direction, that is, a merged form, between the active fins 105, but are not limited thereto. The source/drain regions 120 may have side surfaces having a bent shape in a cross-section along the Y direction. In example embodiments, the source/drain regions 120 may have various shapes, for example, may have any one of polygonal, circular, oval or rectangular shapes.

The source/drain regions 120 may be formed of an epitaxial layer and may include, for example, silicon (Si), silicon germanium (SiGe) or silicon carbide (SiC). The source/drain regions 120 may include impurities such as arsenic (As) and/or phosphorous (P). In example embodiments, the source/drain regions 120 may include a plurality of regions including different concentrations of elements and/or doping elements.

The gate structures 140 may be disposed above the active regions ACT to extend in one direction, for example, the Y direction, across the active regions ACT. The gate structures 140 may be disposed to correspond to the gate electrodes GL_G of FIG. 5A. Channel regions of the transistors may be provided in the active fins 105 intersecting the gate structure 140. The gate structure 140 may include a gate dielectric layer 142, a gate electrode layer 145, gate spacer layers 146, and a gate capping layer 148.

The gate insulating layer 142 may be disposed between the active fin 105 and the gate electrode layer 145 as shown in FIG. 8A. In example embodiments, the gate insulating layer 142 may be configured in multilayers or disposed to extend toward a side surface of the gate electrode layer 145. The gate insulating layer 142 may include an oxide, a nitride or a high dielectric (high-k) material. The high dielectric material may refer to a dielectric material having a dielectric constant higher than that of silicon oxide ($SiO_2$).

The gate electrode layer 145 may include a conductive material and may include, for example, a metal nitride such as a titanium nitride film (TiN), a tantalum nitride film (TaN), or a tungsten nitride film (WN), and/or a metallic material such as aluminum (Al), tungsten (W), molybdenum (Mo), or the like, or a semiconductor material such as doped polysilicon. The gate electrode layer 145 may be configured in a multilayer structure having two or more layers. According to a configuration of the semiconductor device 200, the gate electrode layer 145 may be disposed to be separated between at least some adjacent transistors in the Y direction.

The gate spacer layers 146 may be disposed on both side surfaces of the gate electrode layer 145 as shown in FIGS. 8B and 8C. The gate spacer layers 146 may allow the source/drain regions 120 to be isolated from the gate electrode layer 145. The gate spacer layers 146 may have a multilayer structure according to example embodiments. The gate spacer layers 146 may be formed of an oxide, a nitride, and an oxynitride, in particular, a low-k film. The gate spacer layers 146 may include at least one of, for example, SiO, SiN, SiCN, SiOC, SiON and SiOCN.

The gate capping layers 148 may be disposed on top of the gate electrode layers 145. A lower surface and side surfaces thereof may be surrounded by the gate electrode layer 145 and the gate spacer layers 146, respectively. The gate capping layers 148 may be formed of, for example, an oxide, a nitride, or an oxynitride.

The active isolation layers 135, in contrast to the gate structures 140, may be disposed to correspond to the dummy gate electrodes GL_D of FIG. 5A. The active isolation layers 135 are disposed to extend in the Y direction and may be disposed to extend further into the substrate 101 as compared to the source/drain regions 120. The active isolation layers 135 may be formed by removing a portion of the gate structures 140 and extending downward. Accordingly, components of the gate structures 140 including the gate spacers 146 may partially remain as a part of a dummy gate structure on both sides of the active isolation layers 135. A specific shape of the active isolation layers 135 may be variously modified in example embodiments. The active isolation layers 135 may include an insulating material, and accordingly, may electrically isolate the active regions ACT and the source/drain regions 120 adjacent in the X direction.

The lower interlayer insulating layer 130 may be disposed to cover the source/drain regions 120 and the gate structures 140. The lower interlayer insulating layer 130 may include, for example, at least one of an oxide, a nitride and an oxynitride, and may include a low-k material.

The source/drain contacts CNT_SD may penetrate the lower interlayer insulating layer 130 to be connected to the source/drain regions 120 and may apply an electric signal to the source/drain regions 120. The source/drain contacts CNT_SD may be disposed to extend into a recess of the source/drain regions 120 by a predetermined depth as shown in FIG. 8B, but are not limited thereto. The source/drain contacts CNT_SD may include, for example, a metallic material such as W, Al, Cu, or the like, or a semiconductor material such as doped polysilicon. According to example embodiments, the source/drain contacts CNT_SD may further include a barrier metal layer disposed along an outer surface. Alternately, according to example embodiments, the source/drain contacts CNT_SD may further include a metal-semiconductor layer, such as a silicide layer, disposed at an interface in contact with the source/drain regions 120.

The upper interlayer insulating layer 150 covers the source/drain contacts CNT_SD and may be disposed at the same level as respective levels of an interconnection structure including the lower vias V0, the first interconnection lines M1, the first vias V1, the second interconnection lines M2, the second vias V2, and the third interconnection line M3. The upper interlayer insulating layer 150 may include first to fourth insulating layers 152, 154, 156 and 158, and each may be disposed at the same level as the lower vias V0, the first interconnection lines M1, the first vias V1, the second interconnection lines M2, the second vias V2, and the third interconnection line M3, respectively. The upper interlayer insulating layer 150 may include at least one of, for example, SiO, SiN, SiCN, SiOC, SiON and SiOCN.

The etching-stop layers 160 may be disposed on a lower surface of each of the first to fourth insulating layers 152, 154, 156 and 158. The etching-stop layers 160 may serve as an etching stop layer during an etching process for forming the lower vias V0, the first interconnection lines M1, the first vias V1, the second interconnection lines M2 and the second vias V2. The etching-stop layers 160 may include a high-k material, for example, a silicon nitride or an aluminum oxide.

The lower vias V0, the first interconnection lines M1, the first vias V1, the second interconnection lines M2, the second vias V2, and the third interconnection line M3, which form the interconnection structure, may be sequentially stacked from below. As illustrated in FIG. 8C, the second interconnection lines M2 may each have different widths, e.g., the first and second widths W1 and W2, on the first and second standard cells SC1 and SC2, and may be connected to the third interconnection lines M3 through the second vias V2. The first to third interconnection lines M1 to M3 stacked from below may have a comparatively larger thickness upwardly but are not limited thereto. The interconnection structure may include a conductive material; for example, at least one of Al, Cu and W.

The barrier layers 170 may be disposed in the interconnection structure along a lower surface of the interconnection lines M1 to M3 and the vias V0 to V2 as shown in FIG. 8C. Specifically, the barrier layers 170 may be disposed on lower and side surfaces of the lower vias V0, on lower and side surfaces of the first interconnection lines M1, on lower and side surfaces of first vias V1, on lower and side surfaces of the second interconnection lines M2, on lower and side surfaces of the second vias V2, and on a lower surface of the third interconnection line M3. In particular, the barrier layers 170 may continue to extend toward the lower surface of the first vias V1 along the side surface of the first vias V1 from the lower and side surfaces of the second interconnection lines M2. Such an arrangement of the barrier layers 170 may be resulted from forming the lower vias V0 and the first interconnection lines M1 by a single damascene process and forming the first vias V1 and the second interconnection lines M2, and the second vias V2 and the third interconnection lines M3 by a dual damascene process. The barrier layers 170 may include at least one of titanium (Ti), tantalum (Ta), cobalt (Co), a titanium nitride (TiN), and a tantalum nitride (TaN).

Figure 9:
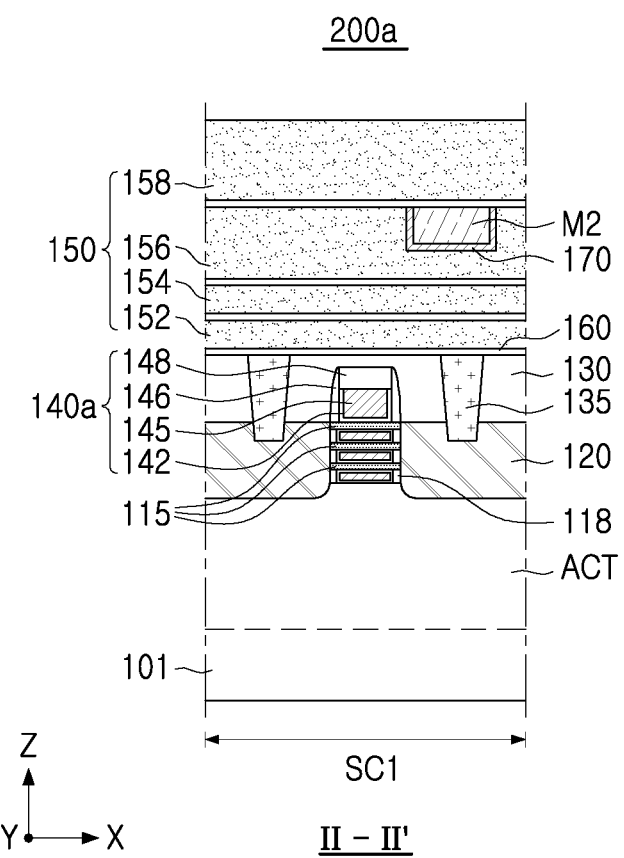
FIG. 9 is a cross-sectional view of a semiconductor device according to an embodiment.

FIG. 9 is a cross-sectional view of a semiconductor device according to example embodiments. FIG. 9 illustrates an example cross-section of the semiconductor device of FIG. 5A taken along line II-IP.

Referring to FIG. 9, a semiconductor device 200a may further include a plurality of channel layers 115 and inner spacer layers 118 disposed between the plurality of the channel layers 115 and in parallel with the gate electrode layers 145. The semiconductor device 200a may include transistors having a gate-all-around structure, in which a gate structure 140a is disposed between an active fin 105 and the channel layers 115 and between the plurality of the channel layers 115 having a nanosheet shape. For example, the semiconductor device 200a may include transistors having a multi bridge channel FET (MBCFET™) by the channel layers 115, source/drain regions 120 and the gate structure 140a.

The plurality of the channel layers 115 may be disposed in two or more layers spaced apart in a direction perpendicular to an upper surface of the active fin 105, for example, the Z direction. The channel layers 115 may be spaced apart from upper surfaces of the active fins 105 while being connected to the source/drain regions 120. The channel layers 115 may have a width the same or similar to that of the active fin 105 in the Y direction and to that of the gate structure 140a in the X direction. According to example embodiments, however, the channel layers 115 may have a reduced width such that side surfaces thereof can be positioned below the gate structure 140a in the Z direction.

The plurality of the channel layers 115 may be formed of a semiconductor material. For example, the channel layers 115 may include at least one of Si, SiGe and Ge. The channel layers 115 may be formed of, for example, a material the same as that of the substrate 101. A number and shapes of the channel layers 115 forming a single channel structure may be variously modified in example embodiments. For example, according to example embodiments, a channel layer may be further placed in a region in which the active fins 105 are in contact with the gate electrode layer 145.

The gate structure 140a may be disposed to extend across and on top of the active fins 105 and the plurality of channel layers 115. A channel region of transistors may be formed on the active fins 105 and the plurality of the channel layers 115 intersecting the gate structure 140a. In this example embodiment, the gate insulating layer 142 may be disposed not only between the active fin 105 and the gate electrode layer 145 but also between the gate electrode layer 145 and the plurality of the channel layers 115. The gate electrode layer 145 may be disposed to extend upwardly of the plurality of the channel layers 115 while filling a space between the plurality of the channel layers 115 upwardly of the active fins 105. The gate electrode layer 145 may be spaced apart from the plurality of the channel layers 115 by the gate insulating layer 142.

The inner spacer layers 118 may be disposed in parallel with the gate electrode layer 145 between the plurality of the channel layers 115. The gate electrode layer 145 is spaced apart from the source/drain regions 120 by the inner spacer layers 118 and thus may be electrically isolated therefrom. The inner spacer layers 118 may have an even side surface facing the gate electrode layer 145 or a side surface convexly rounded toward an inside of the gate electrode layer 145. The inner spacer layers 118 may be formed of one or more of an oxide, a nitride and an oxynitride, and may particularly be formed of a low-k film.

In example embodiments, the semiconductor device 200a having the MBCFET™ structure may be additionally disposed in one region of the semiconductor device described with reference to FIGS. 5A to 7, together with the semiconductor device 200 described with reference to FIGS. 8A to 8C. Further, in example embodiments, the semiconductor device may include a vertical FET, in which an active region perpendicularly extending to an upper surface of the substrate 101 and a gate structure surrounding the same are disposed.

Figure 10:
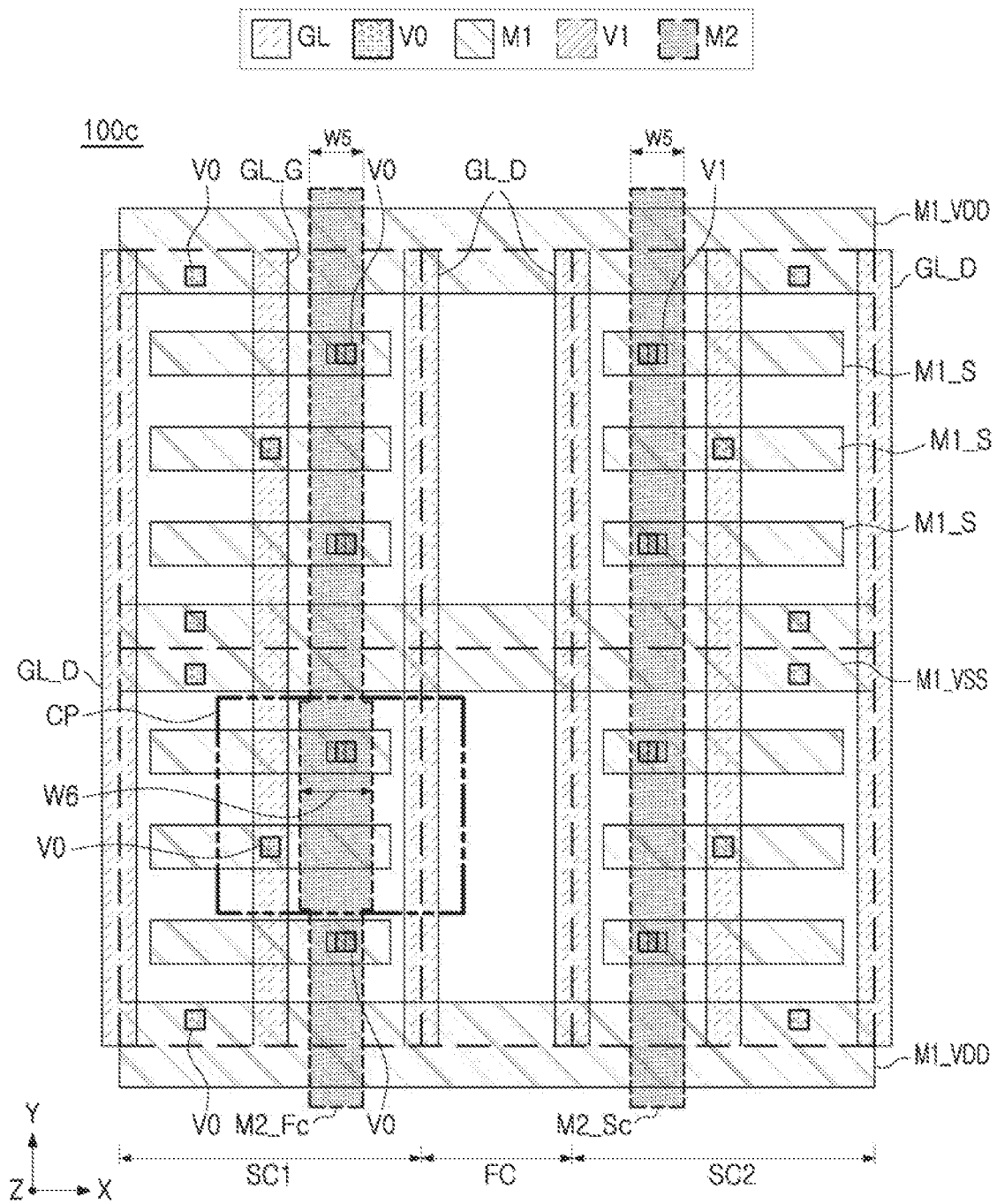
FIGS. 10 and 11 are layout diagrams illustrating a semiconductor device according to embodiments.
Figure 11:
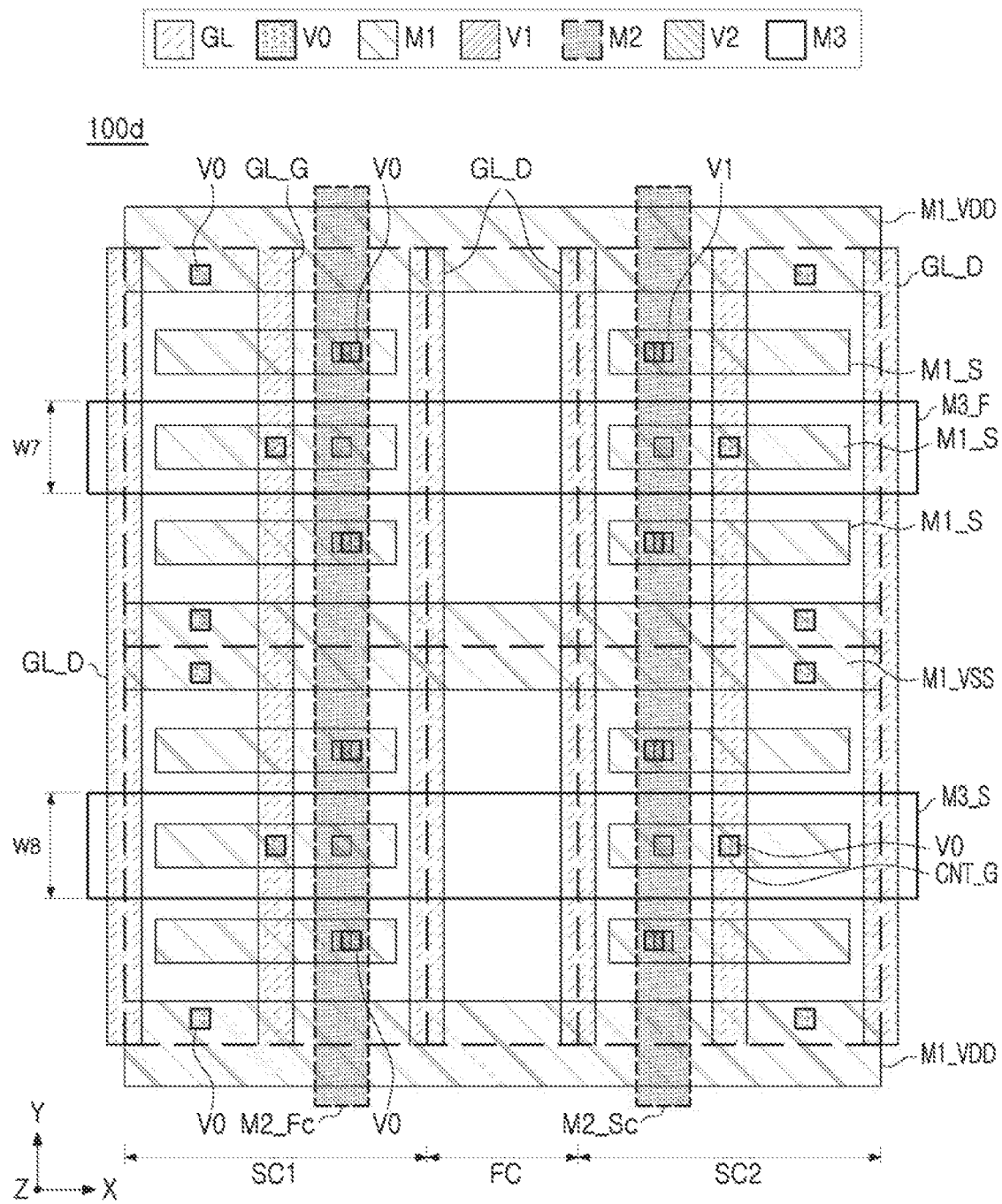

FIGS. 10 and 11 are layout diagrams illustrating a semiconductor device according to example embodiments. FIGS. 10 and 11 illustrate a layout of a region including a region in which the standard cells SC1 and SC2 and the filler cell FC of FIG. 5A are symmetrically and repeatedly disposed in the Y direction. For better understanding, the active region ACT and the contacts CNT of FIG. 5A are omitted from FIGS. 10 and 11, and the second vias V2 and the third interconnection lines M3 are further omitted from FIG. 10.

Referring to FIG. 10, a semiconductor device 100c may be disposed such that second interconnection lines M2 have expanded widths in a critical path region CP. The critical path region CP may be a region extracted during the what-if-analysis process (S160) previously described with reference to FIG. 2.

Specifically, first and second lines M2_Fc and M2_Sc of the second interconnection lines M2 have a fifth width W5 and may have regions extending in the Y direction. However, the first line M2_Fc, among the second interconnection lines M2, may have a sixth width W6, larger than the fifth width W5, locally in the critical path region CP. Accordingly, the first line M2_Fc may have a bent portion in accordance with a width change at a boundary of the critical path region CP. As for the fifth and sixth widths W5 and W6, the relation of the first and second widths W1 and W2 described with respect to FIG. 5A may be identically applied. In particular, the sixth width W6 may be determined in a range, which does not violate design rules in relation to adjacent second interconnection lines M2.

Referring to FIG. 11, third interconnection lines M3 in a semiconductor device 100d may include first and second lines M3_F and M3_S having different widths. Specifically, the third interconnection lines M3 may include first and second lines M3_F and M3_S respectively having a seventh width W7 and an eighth width W8, different from each other, in a direction perpendicular to an extension direction (e.g., the X direction), for example, a width in the Y direction. The eighth width W8 may be larger than the seventh width W7. For example, the eighth width W8 may be in the range of about 101% to about 125% of the seventh width W7. A difference between the seventh and eighth widths W7 and W8 may fall within the range of about 0.5 nm to about 20 nm.

The first and second lines M3_F and M3_S of the third interconnection lines M3 may be formed to have different widths in consideration of a circuit function of the semiconductor device 100d. Each of the first and second lines M3_F and M3_S may electrically connect first and second standard cells SC1 and SC2 to each other. The first and second standard cells SC1 and SC2 electrically connected to each of the first and second lines M3_F and M3_S may be different first and second standard cells SC1 and SC2.

The first and second lines M3_F and M3_S may be formed by producing the first and second lines M3_F and M3_S on the non-uniform tracks in the floorplan process (S110) and the routing process (S150) of FIG. 1. Alternately, the first and second lines M3_F and M3_S may be formed by selectively expanding the width of the second line M3_S by the critical path extraction during the what-if-analysis process (S160) of FIG. 2. A position and a shape of the arrangement of the first and second lines M3_F and M3_S, a lower circuit structure, and the like, of FIG. 11 are examples and may be variously modified in example embodiments.

In this example embodiment, second interconnection lines M2 disposed below the third interconnection lines M3 in the Z direction may have the same width or may have different widths as in the example embodiments of FIGS. 5A to 7. As such, in example embodiments, not only the second interconnection lines M2 but also upper interconnection lines disposed on the second interconnection lines M2 in a routing structure may be disposed to have different widths.

According to the aforementioned example embodiments, the semiconductor device having improved integration and reliability may be provided by allowing a routing structure disposed on the standard cells to include interconnection lines having different widths.

Various advantages and beneficial effects of the disclosure are not limited to the above descriptions and may be easily understood in the course of describing the specific embodiments.

While example embodiments have been shown and described above, it will be apparent to those skilled in the art that modifications and variations could be made without departing from the scope of the disclosure as defined by the appended claims.

What is claimed is:

1. A semiconductor device, comprising:
a plurality of standard cells disposed in a first direction parallel to an upper surface of a substrate and a second direction intersecting the first direction, each standard cell from among the plurality of standard cells comprising an active region, a gate structure disposed to intersect the active region, a source region and a drain region disposed on the active region at either side of the gate structure, and a plurality of first interconnection lines electrically connected to the active region and the gate structure;
a plurality of filler cells disposed between portions of the plurality of standard cells, each filler cell from among the plurality of filler cells comprising a filler active region and a filler gate structure disposed to intersect the filler active region; and
a routing structure disposed on the plurality of standard cells and the plurality of filler cells, the routing structure comprising a plurality of second interconnection lines electrically connecting the respective plurality of first interconnection lines of different standard cells from among the plurality of standard cells to each other,
wherein the plurality of second interconnection lines comprises a first line having a first width and a second line having a second width larger than the first width.

2. The semiconductor device of claim 1, wherein distances between centers of adjacent second interconnection lines from among the plurality of second interconnection lines is constant in a direction perpendicular to an extension direction of the plurality of second interconnection lines.

3. The semiconductor device of claim 2,
wherein the plurality of second interconnection lines comprises another first line having the first width,
wherein each second interconnection line from among the plurality of second interconnection lines comprises a region extending in the second direction, and the first line, the another first line and the second line of the second interconnection lines are sequentially arranged in the first direction, and
wherein a first distance between centers of the first line and the another first line adjacent each other is substantially equal to a second distance between centers of the another first line and the second line adjacent each other, in the first direction.

4. The semiconductor device of claim 1, wherein the first line and the second line comprise signal transmission lines electrically connected to the source region and the drain region of a respective standard cell from among the plurality of standard cells.

5. The semiconductor device of claim 1, wherein the first line and the second line comprise power transmission lines electrically connected to the source region and the drain region of a respective standard cell from among the plurality of standard cells.

6. The semiconductor device of claim 1, wherein the second width is in a range of about 101% to about 125% of the first width.

7. The semiconductor device of claim 6, wherein a difference between the first width and the second width is in a range of about 0.5 nm to about 6 nm.

8. The semiconductor device of claim 1, wherein the second line comprises a first region having the first width and a second region having the second width.

9. The semiconductor device of claim 1, wherein each standard cell from among the plurality of standard cells further comprises dummy gate structures disposed at both ends of the standard cell in the first direction.

10. The semiconductor device of claim 1, wherein, in each standard cell from among the plurality of standard cells, the plurality of first interconnection lines comprises a third line having a third width and a fourth line having a fourth width larger than the third width.

11. The semiconductor device of claim 1, wherein each standard cell from among the plurality of standard cells further comprises a first contact and a second contact connecting the plurality of first interconnection lines to the source region, the drain region and the gate structure, respectively, and
wherein the routing structure further comprises a plurality of vias connecting the plurality of first interconnection lines with the plurality of second interconnection lines.

12. The semiconductor device of claim 11, wherein the routing structure further comprises a barrier layer disposed to be in contact with the plurality of second interconnection lines and the plurality of vias,
wherein the barrier layer extends toward a lower surface of the plurality of vias along side surfaces of the plurality of vias from side surfaces and lower surfaces of the plurality of second interconnection lines.

13. The semiconductor device of claim 1, wherein the routing structure further comprises a plurality of third interconnection lines disposed on the plurality of second interconnection lines and electrically connected to the plurality of second interconnection lines,
wherein the plurality of third interconnection lines comprises a fifth line having a fifth width and a sixth line having a sixth width larger than the fifth width.

14. The semiconductor device of claim 1, wherein each standard cell from among the plurality of standard cells further comprises a plurality of channel layers spaced apart from each other in a direction perpendicular to an upper surface of a respective active region, and
wherein the gate structure is configured to surround the plurality of channel layers.

15. A semiconductor device, comprising:
a first standard cell and a second standard cell disposed on a substrate, each of the first standard cell and the second standard cell comprising a semiconductor element and a first interconnection line electrically connected to the semiconductor element; and
a routing structure comprising a plurality of second interconnection lines extending in a direction across and on the first standard cell and the second standard cell, each second interconnection line from among the plurality of second interconnection lines electrically connecting the first interconnection line of the first standard cell to the first interconnection line of the second standard cell,
wherein the plurality of second interconnection lines comprises a first line and a second line having different widths from each other, and
wherein the first line and the second line comprise signal transmission lines transmitting a signal to the respective semiconductor elements of the first standard cell and the second standard cell.

16. The semiconductor device of claim 15, wherein the plurality of second interconnection lines extend to be longer than each of the first standard cell and the second standard cell.

17. The semiconductor device of claim 16, wherein the first interconnection line of each of the first standard cell and the second standard cell comprises a power transmission line supplying power to the semiconductor element.

18. The semiconductor device of claim 17, wherein the plurality of second interconnection lines extend in a direction perpendicular to an extension line of the respective power transmission lines.

19. A semiconductor device, comprising:

a plurality of standard cells disposed on a substrate, each standard cell from among the plurality of standard cells comprising an active region, a gate structure disposed to intersect the active region, a source region and a drain region on the active region at either side of the gate structure, and a plurality of first interconnection lines electrically connected to the active region and the gate structure; and a routing structure electrically connecting the plurality of standard cells to each other, wherein the routing structure comprises:

a plurality of vias, each via from among the plurality of vias disposed on a respective first interconnection line from among the plurality of first interconnection lines; and a plurality of second interconnection lines disposed on the plurality of vias to have a constant distance between respective centers of the plurality of second interconnection lines, and wherein a first line from among the plurality of second interconnection lines has a width different from a width of a second line from among the plurality of second interconnection lines.

20. The semiconductor device of claim 19, wherein the plurality of second interconnection lines are spaced apart at different distances from each other.

* * * * *